United States Patent
Khoshnevisan et al.

(10) Patent No.: US 11,729,049 B2
(45) Date of Patent: Aug. 15, 2023

(54) UPLINK BEAM FAILURE RECOVERY

(71) Applicant: QUALCOMM Incorporated, San Diego, CA (US)

(72) Inventors: Mostafa Khoshnevisan, San Diego, CA (US); Jing Sun, San Diego, CA (US); Xiaoxia Zhang, San Diego, CA (US); Yitao Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 17/315,880

(22) Filed: May 10, 2021

(65) Prior Publication Data

US 2022/0360490 A1     Nov. 10, 2022

(51) Int. Cl.
| | |
|---|---|
| *H04L 12/24* | (2006.01) |
| *H04L 5/00* | (2006.01) |
| *H04W 72/14* | (2009.01) |
| *H04W 72/12* | (2023.01) |
| *H04W 72/04* | (2023.01) |
| *H04L 41/0668* | (2022.01) |
| *H04W 72/1268* | (2023.01) |
| *H04W 72/23* | (2023.01) |
| *H04W 72/0453* | (2023.01) |

(52) U.S. Cl.
CPC ........ *H04L 41/0668* (2013.01); *H04L 5/0048* (2013.01); *H04W 72/1268* (2013.01); *H04W 72/23* (2023.01); *H04W 72/0453* (2013.01)

(58) Field of Classification Search
CPC ............ H04L 41/0668; H04L 5/0048; H04W 72/042; H04W 72/1268; H04W 72/1289; H04W 72/14; H04W 72/0453
USPC .................................................. 370/225–228
See application file for complete search history.

(56) References Cited

U.S. PATENT DOCUMENTS

| | | | | |
|---|---|---|---|---|
| 2019/0075524 | A1* | 3/2019 | Zhou | H04W 52/228 |
| 2019/0215870 | A1* | 7/2019 | Babaei | H04L 5/0092 |
| 2019/0306867 | A1* | 10/2019 | Cirik | H04W 74/006 |
| 2019/0349061 | A1* | 11/2019 | Cirik | H04L 1/1896 |
| 2020/0350972 | A1* | 11/2020 | Yi | H04W 76/19 |
| 2020/0374960 | A1* | 11/2020 | Deenoo | H04W 72/1284 |
| 2021/0006321 | A1* | 1/2021 | Wang | H04W 16/28 |

* cited by examiner

*Primary Examiner* — Candal Elpenord
(74) *Attorney, Agent, or Firm* — Holland & Hart LLP

(57) ABSTRACT

Methods, systems, and devices for wireless communication are described. In some wireless communication systems, a user equipment (UE) may receive control signaling from a base station based on an uplink beam failure. The control signaling may indicate one or more uplink beams for uplink communications, and the one or more uplink beams may be decoupled from a downlink beam for downlink communications by the UE. The UE may transmit a feedback message acknowledging the one or more uplink beams for the uplink communications based on receiving the control signaling. The UE may switch from one or more current uplink beams to the one or more uplink beams indicated via the control signaling during a time period after receiving the control signaling. The UE may transmit the uplink communications using the one or more uplink beams based on the feedback message.

30 Claims, 15 Drawing Sheets

UPLINK BEAM FAILURE RECOVERY

FIELD OF TECHNOLOGY

The following relates to wireless communication, including uplink beam failure recovery (BFR).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). A UE may receive signals from a base station using downlink beams of the UE. In some cases, the UE may experience a beam failure of a downlink beam used to receive the signals. The UE may perform a BFR procedure to update downlink beams and uplink beams for communications with the base station. In some examples, a UE may communicate with a base station via an uplink dense deployment scenario or via two or more uplink component carriers. In such cases, uplink beams used for uplink communications by the UE may be decoupled from downlink beams used for downlink communications by the UE, which may impact uplink BFR procedures.

SUMMARY

The described techniques relate to improved methods, systems, devices, and apparatuses that support uplink BFR. Generally, the described techniques provide for improved uplink BFR procedures during scenarios in which uplink beams for uplink communications by a UE are decoupled from downlink beams for downlink communications by the UE. To support efficient uplink BFR, a base station may identify an uplink beam failure. The base station may transmit an uplink BFR response message to the UE in response to detecting the uplink beam failure. The uplink BFR response message may indicate one or multiple uplink beams for uplink communications by the UE. The one or multiple uplink beams may be decoupled from a downlink beam for downlink communications, which may indicate an absence of uplink and downlink beam correspondence.

The base station may transmit the uplink BFR response message via control signaling that includes fields configured to indicate the one or multiple uplink beams. The UE may transmit a feedback message to the base station to acknowledge the one or multiple uplink beams based on receiving the uplink BFR message. The UE may then switch to the indicated one or multiple uplink beams for subsequent uplink communications. Switching an uplink beam may be referred to as resetting the uplink beam. The UE may transmit uplink communications using the one or multiple uplink beams after transmitting the feedback message. Accordingly, the UE and the base station may efficiently detect uplink beam failure and perform uplink BFR without uplink and downlink beam correspondence.

A method for wireless communication at a UE is described. The method may include receiving control signaling based on an uplink beam failure, the control signaling indicating one or more uplink beams for uplink communications, the one or more uplink beams for the uplink communications being decoupled from a downlink beam for downlink communications, transmitting a feedback message acknowledging the one or more uplink beams for the uplink communications based on the control signaling, and transmitting the uplink communications using the one or more uplink beams based on the feedback message.

An apparatus for wireless communication at a UE is described. The apparatus may include a processor, memory coupled with the processor, and instructions stored in the memory. The instructions may be executable by the processor to cause the apparatus to receive control signaling based on an uplink beam failure, the control signaling indicating one or more uplink beams for uplink communications, the one or more uplink beams for the uplink communications being decoupled from a downlink beam for downlink communications, transmit a feedback message acknowledging the one or more uplink beams for the uplink communications based on the control signaling, and transmit the uplink communications using the one or more uplink beams based on the feedback message.

Another apparatus for wireless communication at a UE is described. The apparatus may include means for receiving control signaling based on an uplink beam failure, the control signaling indicating one or more uplink beams for uplink communications, the one or more uplink beams for the uplink communications being decoupled from a downlink beam for downlink communications, means for transmitting a feedback message acknowledging the one or more uplink beams for the uplink communications based on the control signaling, and means for transmitting the uplink communications using the one or more uplink beams based on the feedback message.

A non-transitory computer-readable medium storing code for wireless communication at a UE is described. The code may include instructions executable by a processor to receive control signaling based on an uplink beam failure, the control signaling indicating one or more uplink beams for uplink communications, the one or more uplink beams for the uplink communications being decoupled from a downlink beam for downlink communications, transmit a feedback message acknowledging the one or more uplink beams for the uplink communications based on the control signaling, and transmit the uplink communications using the one or more uplink beams based on the feedback message.

In some examples of the method, apparatuses, and non-transitory computer-readable medium described herein, the one or more uplink beams for the uplink communications being decoupled from the downlink beam for the downlink communications indicates an absence of a beam correspondence between the one or more uplink beams and the downlink beam.

In some examples of the method, apparatuses, and non-transitory computer-readable medium described herein, receiving the control signaling may include operations, features, means, or instructions for receiving a downlink control information (DCI) message including a set of DCI fields, a first DCI field of the set of DCI fields indicating the one or more uplink beams for the uplink communications.

Some examples of the method, apparatuses, and non-transitory computer-readable medium described herein may further include operations, features, means, or instructions for determining an uplink component carrier associated with the one or more uplink beams based on a second DCI field of the set of DCI fields indicating the uplink component carrier, where transmitting the uplink communications may be based on the uplink component carrier.

In some examples of the method, apparatuses, and non-transitory computer-readable medium described herein, receiving the DCI message may be based on one or more of an radio network temporary identifier (RNTI), a format of the DCI message, a reserved value of one or more DCI fields of the DCI message, a search space set associated with the DCI message, or a control resource set (CORESET) associated with the DCI message.

Some examples of the method, apparatuses, and non-transitory computer-readable medium described herein may further include operations, features, means, or instructions for determining a grant scheduling one or more of the downlink communications or the uplink communications based on the DCI message, the downlink communications including a physical downlink shared channel (PDSCH) transmission, the uplink communications including a physical uplink shared channel (PUSCH) transmission, where transmitting the feedback message may be based on one or more of the PDSCH transmission or the PUSCH transmission.

Some examples of the method, apparatuses, and non-transitory computer-readable medium described herein may further include operations, features, means, or instructions for determining an uplink resource to transmit the feedback message based on a subset of DCI fields of the set of DCI fields associated with the DCI message, where transmitting the feedback message may be based on the uplink resource.

In some examples of the method, apparatuses, and non-transitory computer-readable medium described herein, receiving the control signaling may include operations, features, means, or instructions for receiving a medium access control (MAC) control element (CE) including a set of MAC-CE fields, a first MAC-CE field of the set of MAC-CE fields indicating the one or more uplink beams for the uplink communications, where transmitting the feedback message may be based on the MAC-CE.

Some examples of the method, apparatuses, and non-transitory computer-readable medium described herein may further include operations, features, means, or instructions for determining an uplink component carrier based on a second MAC-CE field of the set of MAC-CE fields indicating the uplink component carrier, where transmitting the uplink communications may be based on the uplink component carrier.

In some examples of the method, apparatuses, and non-transitory computer-readable medium described herein, a subset of MAC-CE fields of the set of MAC-CE fields each indicate a respective uplink beam failure of a respective uplink beam associated with a respective uplink component carrier of the UE.

In some examples of the method, apparatuses, and non-transitory computer-readable medium described herein, the control signaling indicates a sounding reference signal (SRS) resource identifier (ID) corresponding to at least one SRS resource of a set of SRS resources, the at least one SRS resource corresponding to the one or more uplink beams.

Some examples of the method, apparatuses, and non-transitory computer-readable medium described herein may further include operations, features, means, or instructions for switching to the one or more uplink beams based on the control signaling indicating the one or more uplink beams for the uplink communications, where transmitting the uplink communications may be based on switching to the one or more uplink beams, the uplink communications including one or more of a physical uplink control channel (PUCCH) transmission, a PUSCH transmission, an SRS transmission, or a physical random access channel (PRACH) transmission.

In some examples of the method, apparatuses, and non-transitory computer-readable medium described herein, receiving the control signaling may include operations, features, means, or instructions for receiving a DCI message scheduling the uplink communications, switching to the one or more uplink beams for the uplink communications based on the DCI message satisfying a DCI format, the DCI message missing one or more DCI fields associated with one or more of an SRS resource indicator (SRI) field or a transmission configuration indicator (TCI) field, where transmitting the uplink communications may be based on switching to the one or more uplink beams, the uplink communications including one or more of a PUCCH transmission or a PUSCH transmission.

Some examples of the method, apparatuses, and non-transitory computer-readable medium described herein may further include operations, features, means, or instructions for switching to the one or more uplink beams for the uplink communications on one or more uplink component carriers, where the one or more uplink component carriers includes one or more of an uplink component carrier indicated via the control signaling, or uplink component carriers in a same radio frequency spectrum band as the uplink component carrier.

Some examples of the method, apparatuses, and non-transitory computer-readable medium described herein may further include operations, features, means, or instructions for switching to the one or more uplink beams during a time period after receiving the control signaling indicating the one or more uplink beams for the uplink communications, where transmitting the uplink communications may be based on switching to the one or more uplink beams during the time period after receiving the control signaling.

In some examples of the method, apparatuses, and non-transitory computer-readable medium described herein, the time period occurs after an ending symbol duration associated with receiving the control signaling.

In some examples of the method, apparatuses, and non-transitory computer-readable medium described herein, the time period occurs after an ending symbol duration associated with transmitting the feedback message.

In some examples of the method, apparatuses, and non-transitory computer-readable medium described herein, the time period occurs during a subsequent transmission time interval (TTI).

Some examples of the method, apparatuses, and non-transitory computer-readable medium described herein may further include operations, features, means, or instructions for determining a set of SRS resources to use for uplink BFR based on a configuration and transmitting a set of SRSs based on the set of SRS resources and a set of uplink beams, where receiving the control signaling indicating the one or more uplink beams for the uplink communications may be based on the set of SRS resources, at least one SRS resource of the set of SRS resources corresponding to the one or more uplink beams.

Some examples of the method, apparatuses, and non-transitory computer-readable medium described herein may further include operations, features, means, or instructions for selecting the set of uplink beams based on one or more second uplink beams associated with an uplink control channel or one or more third uplink beams associated with uplink control resource IDs, where transmitting the set of SRSs may be based on the selecting of the set of uplink beams.

A method for wireless communication at a base station is described. The method may include transmitting control signaling based on an uplink beam failure, the control signaling indicating one or more uplink beams for uplink communications, the one or more uplink beams for the uplink communications being decoupled from a downlink beam for downlink communications, receiving a feedback message acknowledging the one or more uplink beams for the uplink communications based on the control signaling, and receiving the uplink communications using the one or more uplink beams based on the feedback message.

An apparatus for wireless communication at a base station is described. The apparatus may include a processor, memory coupled with the processor, and instructions stored in the memory. The instructions may be executable by the processor to cause the apparatus to transmit control signaling based on an uplink beam failure, the control signaling indicating one or more uplink beams for uplink communications, the one or more uplink beams for the uplink communications being decoupled from a downlink beam for downlink communications, receive a feedback message acknowledging the one or more uplink beams for the uplink communications based on the control signaling, and receive the uplink communications using the one or more uplink beams based on the feedback message.

Another apparatus for wireless communication at a base station is described. The apparatus may include means for transmitting control signaling based on an uplink beam failure, the control signaling indicating one or more uplink beams for uplink communications, the one or more uplink beams for the uplink communications being decoupled from a downlink beam for downlink communications, means for receiving a feedback message acknowledging the one or more uplink beams for the uplink communications based on the control signaling, and means for receiving the uplink communications using the one or more uplink beams based on the feedback message.

A non-transitory computer-readable medium storing code for wireless communication at a base station is described. The code may include instructions executable by a processor to transmit control signaling based on an uplink beam failure, the control signaling indicating one or more uplink beams for uplink communications, the one or more uplink beams for the uplink communications being decoupled from a downlink beam for downlink communications, receive a feedback message acknowledging the one or more uplink beams for the uplink communications based on the control signaling, and receive the uplink communications using the one or more uplink beams based on the feedback message.

In some examples of the method, apparatuses, and non-transitory computer-readable medium described herein, the one or more uplink beams for the uplink communications being decoupled from the downlink beam for the downlink communications indicates an absence of a beam correspondence between the one or more uplink beams and the downlink beam.

In some examples of the method, apparatuses, and non-transitory computer-readable medium described herein, transmitting the control signaling may include operations, features, means, or instructions for transmitting a DCI message including a set of DCI fields, a first DCI field of the set of DCI fields indicating the one or more uplink beams for the uplink communications.

In some examples of the method, apparatuses, and non-transitory computer-readable medium described herein, a second DCI field of the set of DCI fields indicates an uplink component carrier associated with the one or more uplink beams.

In some examples of the method, apparatuses, and non-transitory computer-readable medium described herein, the DCI message corresponds to on one or more of an RNTI, a format of the DCI message, a reserved value of one or more DCI fields of the DCI message, a search space set associated with the DCI message, or a CORESET associated with the DCI message.

In some examples of the method, apparatuses, and non-transitory computer-readable medium described herein, the DCI message includes a grant scheduling one or more of the downlink communications or the uplink communications, the downlink communications including a PDSCH transmission, the uplink communications including a PUSCH transmission, and receiving the feedback message may be based on one or more of the PDSCH transmission or the PUSCH transmission.

In some examples of the method, apparatuses, and non-transitory computer-readable medium described herein, transmitting the control signaling may include operations, features, means, or instructions for transmitting a MAC-CE including a set of MAC-CE fields, a first MAC-CE field of the set of MAC-CE fields indicating the one or more uplink beams for the uplink communications, where receiving the feedback message may be based on the MAC-CE.

Some examples of the method, apparatuses, and non-transitory computer-readable medium described herein may further include operations, features, means, or instructions for transmitting a configuration indicating a set of SRS resources to use for uplink BFR and receiving a set of SRSs based on the set of SRS resources and a set of uplink beams, where transmitting the control signaling indicating the one or more uplink beams for the uplink communications may be based on the set of SRS resources, at least one SRS resource of the set of SRS resources corresponding to the one or more uplink beams.

DETAILED DESCRIPTION

Figure 1:
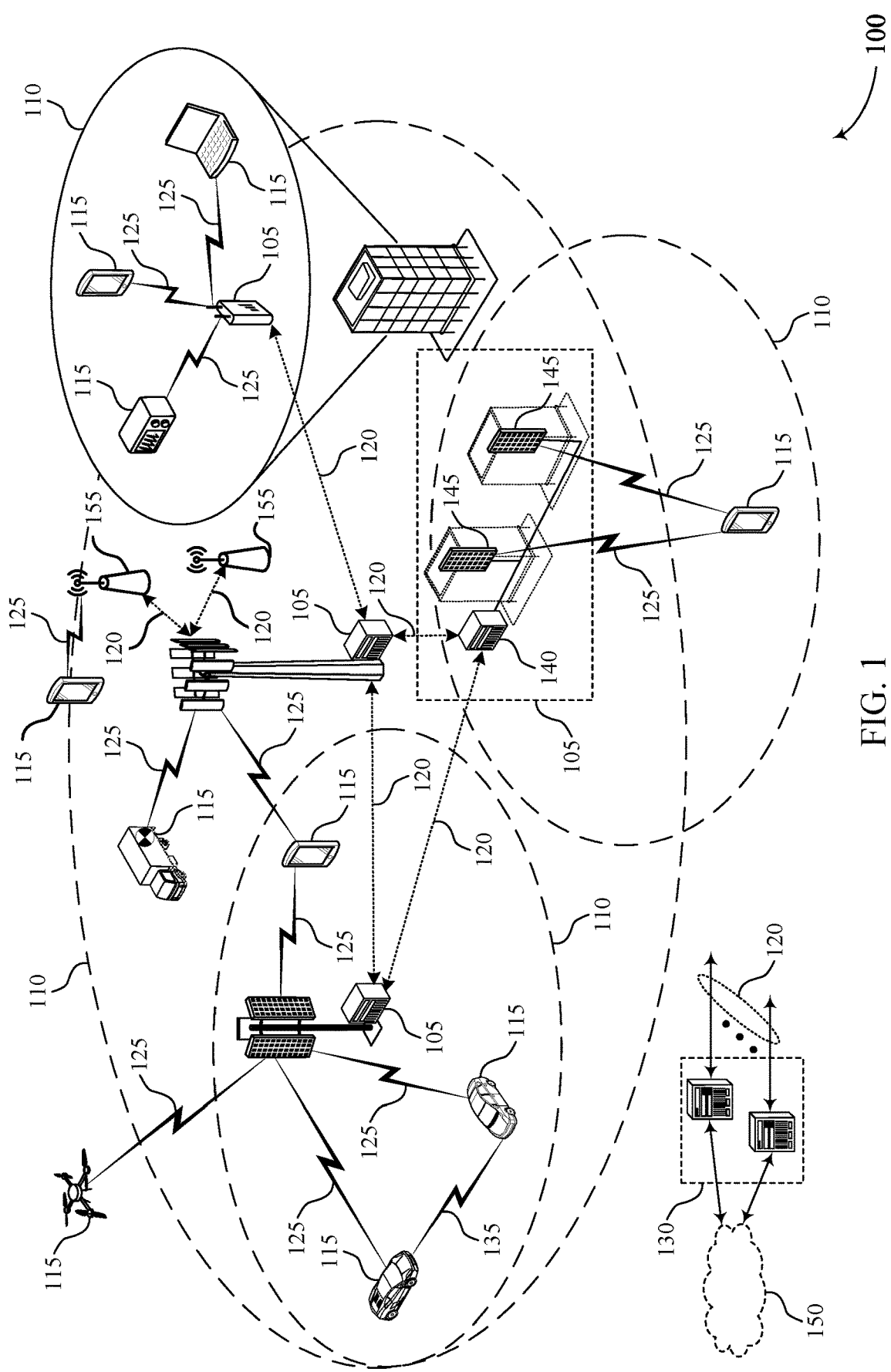
FIGS. 1 and 2 illustrate examples of wireless communications systems that support uplink BFR in accordance with aspects of the present disclosure.

A UE supporting beamforming communications may experience a beam failure. In some cases, the UE may identify a beam failure and select a new beam to use based on downlink reference signals. However, some UEs may operate in an uplink dense deployment scenario, where a UE may receive downlink beamformed transmissions from one network node, such as a base station, and the UE may transmit uplink beamformed transmissions to a different network node, such as an uplink reception point. In other cases, the UE may be configured with two or more uplink carriers configured in different directions. In such cases, the uplink beams used by the UE to transmit may be decoupled from (e.g., may be pointing in different directions or my otherwise be different than) a downlink beam used to transmit downlink beamformed transmissions to the UE, which may indicate an absence of uplink and downlink beam correspondence. When there is no beam correspondence between the uplink and downlink, there may be challenges for the UE to identify uplink beam failure and select a new uplink beam based on downlink reference signals.

To support efficient uplink BFR, a base station may monitor for uplink beam failure and indicate one or more uplink beams to the UE in response to an uplink beam failure. The base station may transmit control signaling including an uplink BFR response message (e.g., an uplink-only BFR response message) to the UE to indicate the one or more uplink beams for the UE to switch to for subsequent communications. The UE may determine that an uplink beam failure occurred based on receiving the uplink BFR message, or the uplink BFR message may convey an explicit indication of the uplink beam failure. The uplink BFR message may be transmitted via a DCI, a MAC-CE, or some other control signaling. One or more fields in the control signaling may be repurposed to indicate the one or more uplink beams or other parameters associated with the uplink BFR. In some examples, the uplink BFR message may point to a previous uplink transmission, which may indicate that the UE is to switch to the same uplink beams that were used for transmission of the identified uplink transmission.

The UE may switch from one or more current uplink beams to the one or more uplink beams indicated via the BFR message for subsequent transmissions. In some examples, switching the uplink beams may be referred to as resetting the uplink beams at the UE. The UE may reset uplink beams in response to the uplink BFR message until the UE identifies another activation or configuration of uplink beams for subsequent uplink communications by the UE. The UE may reset uplink beams in response to the uplink BFR message for a configured subset of uplink control channel transmissions, uplink shared channel transmissions, SRS transmissions, PRACH transmissions, or any combination thereof. The resetting may occur a threshold time period after receipt of the uplink BFR message or after transmission of a feedback message in response to the uplink BFR message.

In some examples, a set of uplink reference signals may be configured for the uplink BFR procedure. That is, an applicability or usage of a set of uplink reference signal resources, such as SRS resources, may be configured by the base station to be for uplink-only BFR. If a reference signal resource set is configured for uplink BFR, the UE may autonomously (e.g., without a configuration or signaling from the base station) select a set of one or more uplink beams to use for transmitting the reference signals via the reference signal resource set. The UE may select the set of uplink beams based on uplink beams associated with an uplink control channel or uplink control resource IDs. The base station may select an uplink beam from the set of uplink beams and indicate the selected uplink beam via the uplink BFR response message. In some cases, the uplink BFR response message may point to one of the set of uplink reference signals that was transmitted using the selected uplink beam. Accordingly, a UE may transmit reference signals configured for uplink-only BFR to facilitate an efficient and accurate uplink BFR procedure.

Aspects of the disclosure are initially described in the context of wireless communications systems. Aspects of the disclosure are further illustrated by and described with reference to apparatus diagrams, system diagrams, and flowcharts that relate to uplink BFR.

FIG. 1 illustrates an example of a wireless communications system 100 that supports uplink BFR in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology). The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a TTI. In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a CORESET) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In the wireless communications system 100, a UE 115 may perform beam failure detection (BFD) during communications with a base station 105. The UE 115 may be configured to monitor a radio link quality associated with one or more communication signals or resources of a BFR resource set, such as CSI-RS, SSBs, or other reference signals, to perform the BFD. The BFR resource set may be configured via RRC signaling. Additionally or alternatively, the UE 115 may monitor reference signal sets indicated by active TCI states of CORESETs monitored by the UE 115. If the UE 115 determines that the radio link quality of each reference signal in a BFD resource set falls below a threshold value, the UE 115 may declare BFD. The UE 115 may monitor each beam in a candidate beam list corresponding to periodic CSI-RSs or SSBs configured via RRC signaling. If the UE 115 declares BFD, the UE 115 may select a new beam (e.g., q_new) from the candidate beam list. The UE 115 may be configured with one or more BFR procedures for indicating the selected beam to a base station 105. The BFR procedures may be based on whether the BFR procedure is performed for a primary cell (PCell), a secondary cell (SCell), a primary-secondary cell (PSCell), or any combination thereof.

The BFR procedure for a PCell or a PSCell may be based on a random access procedure. That is, the UE 115 may initiate a random access procedure (e.g., contention-free random access (CFRA)) using a random access channel (RACH) preamble or resource that corresponds to the selected uplink beam. Alternatively, for contention-based random access (CBRA) procedures, the UE 115 may transmit an indication of the beam failure via a random access MAC-CE (e.g., a Msg3 or MsgA), and the MAC-CE may indicate that the CBRA procedure is based on detection of a beam failure. The base station 105 may transmit a BFR response message to indicate BFR completion. The BFR response may be transmitted, in response to the random access preamble message, via a physical downlink control channel (PDCCH) in a search space set allocated for detection of a DCI format that includes CRC bits scrambled by a cell RNTI (C-RNTI) or a modulation and coding scheme (MCS) C-RNTI (MCS-C-RNTI) (e.g., a search space set provided by a parameter, such as recovery SearchSpaceId).

In other examples, if the UE 115 detects beam failure on an SCell, the UE 115 may transmit a link recovery request (LRR) message to the network (e.g., via a PCell or PSCell). The UE 115 may receive an uplink grant in response to the LRR message. The uplink grant may schedule a PUSCH for transmission of a MAC-CE by the UE 115. The UE 115 may thereby transmit an indication of the selected uplink beam (e.g., by indicating a reference signal corresponding to the selected uplink beam) via the MAC-CE transmitted via the PUSCH. A base station 105 may transmit a BFR message in response to the MAC-CE to determine the BFR completion. The BFR message may be transmitted via an uplink grant that may schedule one or more transmissions by the UE 115 for a same HARQ process as the PUSCH carrying the MAC-CE.

That is, a UE 115 may perform BFR by monitoring a quality of downlink reference signals to detect a beam failure and identifying a new uplink beam from a set of candidate beams used for reception of the downlink signals by the UE 115. The UE 115 may switch to the selected uplink beam (e.g., an automatic beam reset) a configured time period after the BFR procedure (e.g., 28 symbols after the BFR completion, or some other duration). The UE 115 may, in some examples, reset the beams of each CORESET to the selected beam (e.g., q_new). The UE 115 may additionally or alternatively reset one or more beams (e.g., and pathloss reference signals for power control) of one or more PUCCH resources to the selected beam.

The wireless communications system 100 may include one or more uplink nodes 155, which may be (or may otherwise support functionality for) repeater nodes, daughter nodes, or any other device configured with uplink capabilities. The uplink nodes 155 may represent uplink receive points that are configured for reception of uplink transmissions from UEs 115 (e.g., via a communication link 125), but may not be configured for transmission of downlink transmissions to the UEs 115. The uplink nodes 155 may communicate or forward received uplink transmissions to an associated base station 105, such as via a backhaul link 120. The base station 105 may represent an example of a macro node (e.g., a central node or a serving cell). The deployment of the uplink nodes 155 may be referred to as an uplink dense deployment. In some cases, a UE 115 and a base station 105 may communicate in the uplink via a supplementary uplink (SUL) carrier. In cases where the UE 115 communicates with the base station 105 in the uplink via an uplink node 155 or via an SUL carrier, uplink transmit beams used by the UE 115 may be decoupled from one or more downlink beams, which may indicate an absence of uplink and downlink beam correspondence.

Some BFR procedures, as described above, may include identifying beam failure based on measurements associated with a set of downlink beams and signals. Additionally or alternatively, a UE 115 may select a new candidate uplink beam based on the set of downlink beams. However, in scenarios in which there is an absence of uplink and downlink beam correspondence, such as during uplink dense deployment or SUL configuration scenarios, selecting an uplink beam based on downlink beams may be inefficient and inaccurate. Moreover, BFD may be detected for downlink signals, and an uplink beam may not have experienced a failure. Thus, performing such BFR procedures in scenarios in which there is not uplink and downlink beam correspondence may be inefficient and unnecessary, and may decrease communication quality.

To support improved BFR procedures and faster transmit beam selection during scenarios in which there is no uplink and downlink beam correspondence, a base station 105 may transmit an uplink (e.g., uplink-only) BFR response message to a UE 115. The uplink BFR response message may be transmitted in response to uplink beam failure, and may indicate one or more uplink beams for the UE 115 to use. The base station 105 may transmit the uplink BFR response message to the UE 115 via control signaling, such as DCI or a MAC-CE. The uplink BFR response message may indicate one or more uplink beams for uplink communications by the UE 115. The UE 115 may determine that uplink beam failure has occurred based on receiving the uplink BFR message, or the uplink BFR message may include an explicit indication of the uplink beam failure. The UE 115 may transmit a feedback message (e.g., an acknowledgement (ACK) message) to the base station 105 to acknowledge the one or more uplink beams based on receiving the uplink BFR message. The UE 115 may switch from a first uplink beam to the indicated one or more uplink beams for subsequent uplink communications. The UE 115 may transmit the uplink communications using the one or more uplink beams after transmitting the feedback message. Accordingly, the UE 115 and the base station 105 may perform uplink beam selection in response to an uplink beam failure when there is no uplink and downlink beam correspondence.

Figure 2:
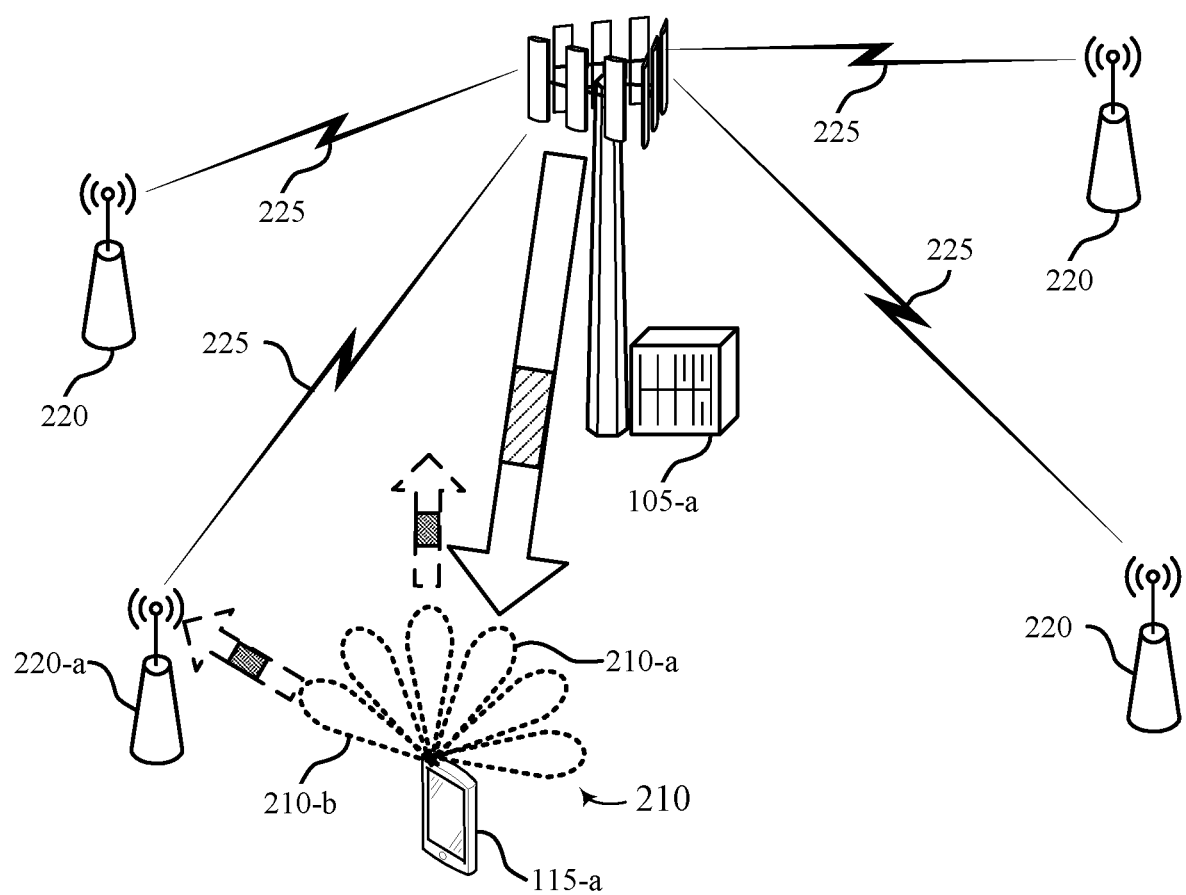

FIG. 2 illustrates an example of a wireless communications system 200 that supports uplink BFR in accordance with aspects of the present disclosure. The wireless communications system 200 may implement aspects of the wireless communications system 100 or may be implemented by aspects of the wireless communications system 100. For example, the wireless communications system 200 may include a base station 105-a and a UE 115-a, which may represent examples of a base station 105 and a UE 115 as described with reference to FIG. 1. The wireless communications system 200 may be referred to as an uplink dense deployment system and may include one or more uplink nodes 220, which may represent examples of the uplink nodes 155 described with reference to FIG. 1. The wireless communications system 200 may support techniques for the base station 105-a to indicate one or more uplink beams for the UE 115-a to use in response to an uplink beam failure.

The UE 115-a may communicate with the base station 105-a using a set of beams 210, which may include one or more uplink beams (also referred to as transmit beams) or one or more downlink beams (also referred to as receive beams), or any combination thereof. In some examples, the base station 105-a may transmit downlink signals to the UE 115-a, which may receive the downlink signals using a beam 210-a (e.g., a downlink beam). In some other examples, the UE 115-a may transmit uplink signals 235 to the base station 105-a using the beam 210-a (e.g., an uplink beam). Alternatively, the UE 115-a and the base station 105-a may communicate over one or more uplink nodes 220 (e.g., in an uplink dense deployment scenario, as described with reference to FIG. 1).

The UE 115-a may transmit the uplink signals 235 to an uplink receive point, which may be represented by an uplink node 220. For example, the UE 115-a may transmit the uplink signals 235 to the uplink node 220-a using a beam 210-b (e.g., an uplink beam). The uplink nodes 220 may be connected to the base station 105-a (e.g., a macro node) via backhaul links 225 (e.g., wired or wireless links), such that one or more uplink nodes 220 may receive the uplink signals 235 from the UE 115-a and forward associated uplink data or uplink information to the base station 105-a (e.g., transmit an indication of the uplink data or information, such as via the backhaul link 225). In such cases, the UE 115-a may continue to receive downlink signals or channels from the base station 105-a (e.g., a macro node, serving cell, serving base station 105), which may represent a different communication node (e.g., at a different location) than an uplink nodes 220 used for uplink communications.

An uplink dense deployment scenario as described herein may improve uplink coverage and capacity. For example, using one or more uplink nodes 220 for communications between the UE 115-a and the base station 105-a may reduce uplink pathloss (e.g., among other examples). The reduction in pathloss may increase uplink communication speed and throughput, which may in turn reduce a bottlenecking effect for the uplink communications (e.g., as compared to downlink communications). Additionally or alternatively, the uplink dense deployment may reduce deployment cost and complexity for network entities (e.g., for the uplink nodes 220), while increasing coverage, because the uplink nodes 220 may not be configured to transmit downlink signals or perform configurations. For example, each uplink node 220 may be configured to receive uplink signals (e.g., from the UE 115-a) and send the uplink signals to the base station 105-a.

The UE 115-a and the base station 105-a may communicate in the uplink via an SUL carrier. In such cases, the UE 115-a may be configured with two uplink carriers for one downlink carrier of a same serving cell, where uplink transmissions on the two uplink carriers may not be simultaneous. One of the uplink carriers may be configured as SUL (e.g., such that the other uplink carrier may be a non-SUL or normal uplink (NUL) carrier), and the UE 115-a may select which uplink carrier to use for uplink transmissions. In some examples, the UE 115-a may be configured with a TDD band (e.g., TDD uplink carrier) and SUL carrier, such that the UE 115-a may transmit uplink information on either the TDD band (e.g., non-SUL or NUL carrier) or on the SUL carrier.

In cases where the UE 115-a communicates with the base station 105-a in the uplink via an uplink node 220 (e.g., the uplink node 220-a), one or more beams 210, such as the beam 210-b (e.g., an uplink beam), may be associated with the uplink node 220 (e.g., and not with the base station 105-*a*). Similarly, in cases where the UE 115-*a* communicates with the base station 105-*a* using an SUL carrier, one or more beams of the set of beams 210 for the SUL carrier may not be associated with one or more beams of the set of beams 210 for the associated downlink carrier. In other words, an uplink beam used for uplink communications by the UE 115-*a* may be decoupled from a downlink beam used for downlink communications by the UE 115-*a*, which may indicate an absence of beam correspondence between the uplink and downlink beams.

In some cases, the UE 115-*a* may experience a beam failure on a downlink beam of the set of beams 210, for example the beam 210-*a*. The beam failure may be detected based on a reference signal associated with the beam 210-*a* falling below a threshold. The UE 115-*a* may perform a BFR procedure in response to detecting the beam failure. In many cases, as described with reference to FIG. 1, the BFR procedure may include identifying new candidate downlink and uplink beams based on one or more downlink beams of the set of beams 210 used to receive a set of downlink signals, although an uplink beam (e.g., the beam 210-*b*) does not correspond to the downlink beam (e.g., the beam 210-*a*), and the uplink beam may not have experienced a failure. Thus, selecting new beams for both uplink and downlink may be inefficient and unnecessary, and may decrease communications quality.

To improve an efficiency and accuracy associated with uplink BFR procedures (e.g., uplink-only BFR) when there is no uplink and downlink beam correspondence, the base station 105-*a* may be configured to monitor BFD signals, such as SRSs, to detect when an uplink beam failure occurs (e.g., instead of the UE 115-*a*). The base station 105-*a* may monitor a quality of uplink beams of the set of beams 210 used for transmitting the periodic SRS resources. Alternatively, the base station 105-*a* may monitor a quality of uplink beams of the set of beams 210 used to transmit other uplink signals, such as PUSCH transmissions, PUCCH, transmissions, or other uplink messages (e.g., uplink beams that are currently configured for communications by the UE 115-*a*). The base station 105-*a* may declare BFD if the quality of the monitored uplink beams of the set of beams 210 falls below a threshold value.

If BFD is declared, the base station 105-*a* may select a new uplink beam of the set of beams 210 from a candidate set of uplink beams of the set of beams 210 for the UE 115-*a*. In some cases, the base station 105-*a* may configure or trigger the UE 115-*a* to transmit uplink reference signals, such as periodic SRS, semi-periodic SRS, aperiodic SRS, or some other reference signals, without indicating an uplink beam of the set of beams 210 for the UE 115-*a*. That is, the UE 115-*a* may select the uplink beams of the set of beams 210 for transmission of the uplink reference signals, and the uplink beams of the set of beams 210 selected by the UE 115-*a* may make up the candidate set of uplink beams of the set of beams 210. The base station 105-*a* may identify a preferred beam from the candidate set of uplink beams of the set of beams 210 to configure for subsequent communications.

In some cases, however, the UE 115-*a* may select the uplink beams of the set of beams 210 and transmit the uplink reference signals, and the UE 115 *a* may not be aware that the corresponding SRS resources are configured for a BFR procedure. In such cases, if the base station 105-*a* selects an uplink beam of the set of beams 210 from the set of candidate uplink beams of the set of beams 210 without performing a defined uplink BFR procedure, the base station 105-*a* may transmit control signaling 230 to configure each uplink channel or signal with the selected uplink beam (e.g., the beam 210-*a* may be RRC configured for each PUCCH, PUSCH, or other uplink channel), which may increase latency after an uplink beam failure. Additionally or alternatively, the base station 105-*a* may configure a set of uplink TCI states by pointing to one or more SRS resource IDs (e.g., the base station 105-*a* may pre-configure the TCI states based on beams that are not identified yet). The base station 105-*a* may thereby indicate a selected uplink beam without performing defined uplink BFR procedures by transmitting DCI to indicate one of the configured TCI states that corresponds to the selected uplink beam. However, utilizing the configured TCI states may also increase overhead (e.g., an RRC overhead) and latency associated with uplink BFR.

To support efficient beam selection and recovery after uplink beam failure, the base station 105-*a* may transmit an uplink BFR message to indicate one or more new uplink beams of the set of beams 210 for the UE 115-*a*. The uplink BFR message may be referred to as an uplink-only BFR message. The base station 105-*a* may thereby transmit the control signaling 230 including the uplink BFR message in response to detecting beam failure. The uplink BFR message may be transmitted via DCI, a MAC-CE, or some other control signaling. By transmitting the uplink BFR to indicate one or more uplink beams of the set of beams 210 for the UE 115-*a*, the base station 105-*a* may reduce overhead (e.g., RRC overhead) and latency associated with uplink BFR procedures. The uplink BFR message may implicitly indicate that an uplink beam failure was detected by the base station 105-*a*. That is, the UE 115-*a* may identify uplink beam failure occurred based on receiving the uplink BFR message. Additionally or alternatively, the uplink BFR message may include an indication (e.g., an explicit indication) of the uplink beam failure.

In some examples, the uplink BFR message may be transmitted via a DCI message including a set of DCI fields. One or more of the DCI fields may indicate the one or more new uplink beams of the set of beams 210 for the UE 115-*a*. One or more other DCI fields (e.g., a carrier indicator field (CIF)) may indicate an uplink component carrier associated with the one or more new uplink beams of the set of beams 210. Alternatively, the UE 115-*a* may determine which component carrier is applicable to the indicated one or more uplink beams of the set of beams 210 based on a component carrier in which the DCI message is received. The UE 115-*a* may receive the DCI message and determine that the DCI message is configured for the uplink BFR message based on one or more of an RNTI, a format of the DCI message, a search space set associated with receipt of the DCI message, a CORESET associated with the receipt of the DCI message, a reserved value of one or more fields of the DCI message (e.g., one or more of a frequency domain resource allocation (FDRA), HARQ process number, new data indicator (NDI), or redundancy version (RV) field may be set to one or more reserved values to indicate that the DCI is configured for uplink BFR), or any combination thereof.

The UE 115-*a* may transmit a feedback message (e.g., an ACK or negative ACK (NACK) message) in response to the DCI. The feedback message may acknowledge receipt of the DCI indicating the one or more new uplink beams of the set of beams 210. In some examples, the DCI may indicate a grant scheduling PUSCH or PDSCH communications by the UE 115-*a*. If the DCI schedules a PUSCH transmission by the UE 115-*a*, the PUSCH transmission by the UE 115-*a* may include the feedback message (e.g., the PUSCH transmission may acknowledge receipt of the DCI message). If the DCI message schedules a PDSCH transmission to the UE 115-*a*, the UE 115-*a* may transmit the feedback message via HARQ-Ack corresponding to the PDSCH. In other examples, the DCI message may not schedule communications by the UE 115-*a*. A subset of fields in the DCI message (e.g., fields related to HARQ-Ack feedback, such as a K1 value, a PUCCH resource indicator (PRI), a downlink assignment index (DAI), or the like) may indicate PUCCH resources for the UE 115-*a* to use for transmitting the feedback message.

In other examples, the uplink BFR message may be transmitted via a MAC-CE including a set of MAC-CE fields. One or more of the MAC-CE fields may indicate the one or more uplink beams of the set of beams 210 for the UE 115-*a*. One or more other MAC-CE fields may indicate a component carrier to which the one or more indicated uplink beams of the set of beams 210 may be applied. In some examples, if the base station 105-*a* detects uplink beam failure for more than one component carrier, a subset of the MAC-CE fields may each be configured to indicate a respective uplink beam failure of a respective uplink beam of the set of beams 210 associated with a respective uplink component carrier of the UE 115-*a*. The MAC-CE fields may indicate a new uplink beam of the set of beams 210 for each component carrier. The UE 115-*a* may transmit a feedback message in response to the PDSCH that carries the MAC-CE.

Irrespective of whether the uplink BFR message is transmitted via a DCI message, a MAC-CE, or some other control signaling, the indication of the one or more uplink beams of the set of beams 210 may be an ID corresponding to a candidate resource, such as a candidate SRS resource, previously transmitted by the UE 115-*a*. The SRS resource ID may indicate, to the UE 115-*a*, to use a same uplink beam of the set of beams 210 as the uplink beam of the set of beams that was used for an SRS transmission (e.g., a most recent transmission) in the indicated SRS resource. The UE 115-*a* may receive the uplink BFR message and switch from current uplink beams of the set of beams 210 configured for the UE 115-*a* to the indicated one or more uplink beams of the set of beams 210 for subsequent uplink transmissions. Switching to the indicated uplink beams of the set of beams 210 may be referred to as resetting the uplink beams.

In some examples, the UE 115-*a* may switch to the uplink beams of the set of beams 210 indicated in the uplink BFR message for uplink communications (e.g., transmission of uplink signals 235 or channels) until the UE 115-*a* identifies an activation or configuration for uplink beams of the set of beams 210 for subsequent uplink communications (e.g., a higher layer may activate or configure uplink beams of the set of beams 210, spatial relation information, or both, for each channel or resource transmitted by the UE 115-*a*). By switching to the uplink beams of the set of beams 210 in response to the uplink BFR message, the UE 115-*a* may reduce a delay between an uplink beam failure and a recovery from the uplink beam failure. For example, if the UE 115-*a* refrains from switching to the uplink beams of the set of beams 210 in response to the uplink BFR message, the UE 115-*a* may wait until the base station 105-*a* transmits the control signaling 230, such as an RRC configuration, to configure one or more uplink beams of the set of beams 210 for the UE 115-*a*, which may increase latency.

In some examples, the UE 115-*a* may be configured to reset the uplink beams of the set of beams 210 in response to the uplink BFR message for all uplink transmissions or for a subset of uplink transmissions. That is, the UE 115-*a* may receive an RRC configuration prior to the BFR procedure that may configure the UE 115-*a* to perform uplink beam switches for an indicated subset of uplink transmissions. In one example, the UE 115-*a* may be configured to apply the beam switch for PUSCH transmissions, PUCCH transmissions, PRACH transmissions, SRS transmissions, or any combination thereof. Alternatively, the beam switches may be applied for PUSCH transmissions, PUCCH transmissions, or both. In another example, the beam switches may be applied to PUCCH transmissions, PUSCH transmissions scheduled by a DCI format that does not include an SRI field or a TCI field (e.g., a fallback DCI 0_0 format), or both. If the UE 115-*a* is not configured to switch uplink beams of the set of beams 210 in response to the uplink BFR message for an uplink transmission, such as an SRS transmission, the UE 115-*a* may delay the transmission until the UE 115-*a* receives control signaling that configures one or more uplink beams of the set of beams 210 for the transmission.

The uplink BFR message may indicate an uplink component carrier to which the one or more indicated uplink beams of the set of beams 210 may be applied. The UE 115-*a* may perform the beam switch for each configured uplink transmission on the indicated uplink component carrier. Additionally or alternatively, the UE 115-*a* may perform the beam switch for each configured uplink transmission on one or more other uplink component carriers that are in a same radio frequency spectrum band as the indicated uplink component carrier.

The UE 115-*a* may switch to the one or more uplink beams of the set of beams 210 during a time period (e.g., a threshold time period) after receiving the control signaling 230 including the uplink BFR message. In one example, the time period may begin after an ending symbol duration associated with receiving the control signaling 230. In other words, the time period may begin after a last symbol of a PDSCH carrying the MAC-CE that includes the uplink BFR message or after a last symbol of a DCI message that includes the uplink BFR message. Alternatively, the time period may begin after an ending symbol duration associated with transmitting the feedback message in response to the uplink BFR message. That is, the time period may begin after a last symbol of a PUCCH or PUSCH in which the feedback message is transmitted. If the time period (e.g., a reset time) ends in the middle of a TTI (e.g., a slot), the time period may be quantized to a subsequent TTI, such that the UE 115-*a* may begin transmitting uplink communications using the new uplink beams of the set of beams 210 at a beginning of the subsequent TTI.

Accordingly, the base station 105-*a* may transmit an uplink BFR message to the UE 115-*a* in response to detecting uplink beam failure. In some examples, the base station 105-*a* may configure the UE 115-*a* with a set of uplink beams of the set of beams 210 to use for transmitting a set of BFD reference signals, and the base station 105-*a* monitor a quality of the set of uplink beams of the set of beams 210 to determine whether an uplink beam failure occurs. The base station 105-*a* may configure the set of uplink beams via an RRC configuration, which may increase latency and overhead.

To reduce latency and overhead associated with uplink BFR, the base station 105-*a* may configure a set of SRS resources for an uplink-only BFR procedure. Each SRS resource set configured for the UE 115-*a* may be configured with a usage. In some cases, the usage may be set to one of four possibilities (e.g., beamManagement, codebook, non-Codebook, or antennaSwitching). As described herein, a usage of an SRS resource set may be configured for uplink-only BFR (e.g., ULBFR). If an SRS resource set is configured for uplink BFR, the base station 105-*a* may continue to configure the time resources, frequency resources, and other parameters associated with the SRS resource set, but the base station 105-*a* may refrain from transmitting the control signaling 230 to configure the uplink beams of the set of beams 210 for the SRS resource set, which may reduce overhead. Instead, if the usage is set for uplink BFR, the uplink beams of the set of beams 210 used by the UE 115-*a* to transmit the SRS resources may be determined by the UE 115-*a* based on a rule. For example, the uplink beams of the set of beams 210 for the SRS resources may be determined by the UE 115-*a* based on uplink beams of the set of beams 210 corresponding to PUCCH resources or PUCCH resource IDs. That is, if N SRS resources are configured in an SRS resource set, the first N uplink beams of the set of beams 210 corresponding to PUCCH resources with the N lowest ID values may be used for transmission of the SRS resources.

As such, a base station 105 and a UE 115 as described herein may perform uplink BFR during scenarios in which there is not uplink and downlink beam correspondence. In some examples, the base station 105 may detect uplink beam failure based on a set of reference signals that may be transmitted using uplink beams configured by the base station 105 or determined by the UE 115 based on a rule. By transmitting an uplink BFR message in response to the uplink beam failure, the base station 105 may efficiently indicate one or more uplink beams for the UE 115 to switch to for subsequent uplink communications.

Figure 3:
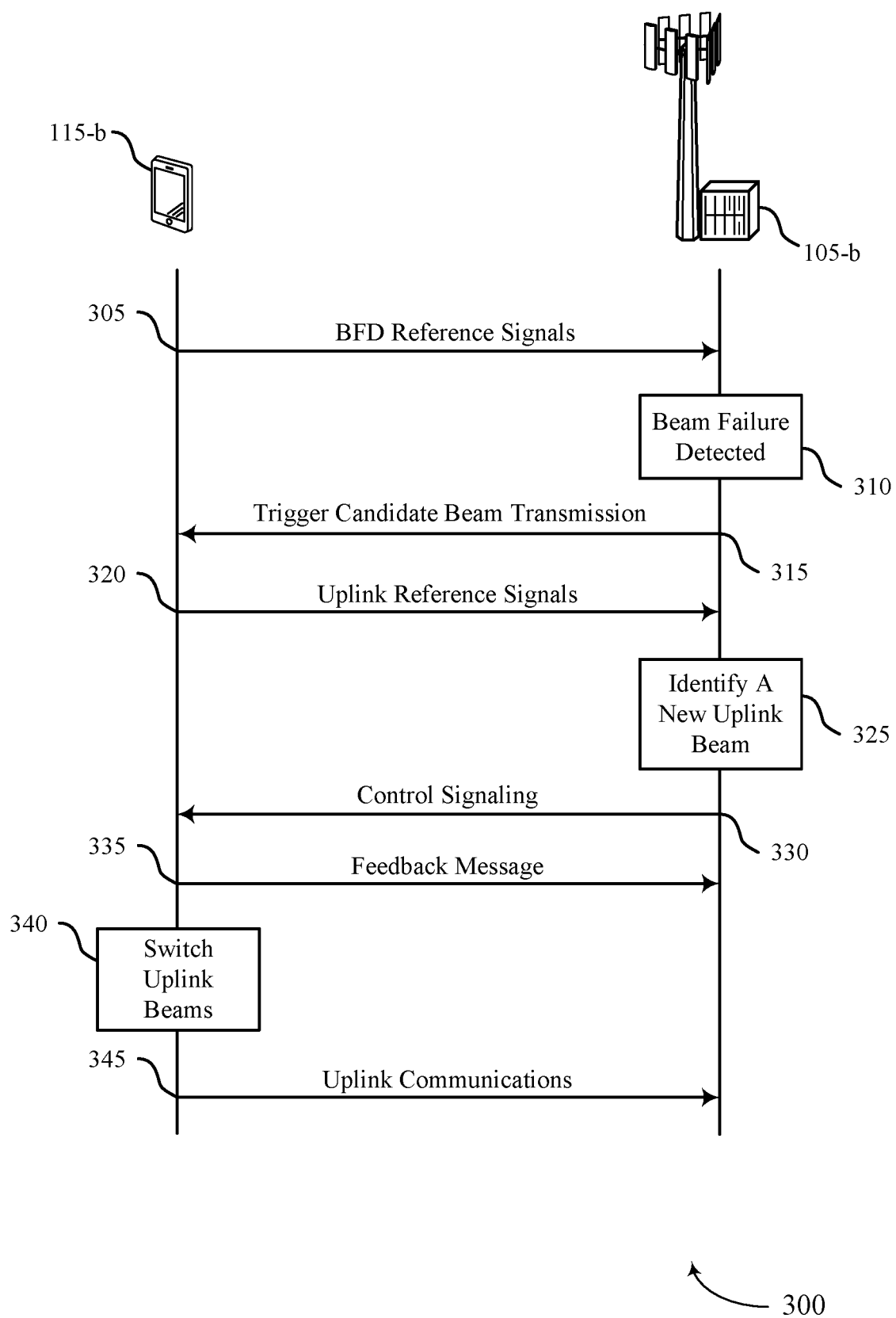
FIGS. 3 and 4 illustrate examples of process flows that support uplink BFR in accordance with aspects of the present disclosure.

FIG. 3 illustrates an example of a process flow 300 that supports uplink BFR in accordance with aspects of the present disclosure. The process flow 300 may implement aspects of the wireless communications systems 100 and 200 or may be implemented by aspects of the wireless communications systems 100 and 200 as described with reference to FIGS. 1 and 2, respectively. For example, the process flow 300 may implement or be implemented by a base station 105-*b* and a UE 115-*b*, which may be examples of a base station 105 and UEs 115 as described with reference to FIGS. 1 through 2. In some examples, the process flow 300 may illustrate operations that may be performed in a first example of a BFD procedure described herein (e.g., BFD Case 1). In the following description of the process flow 300, the operations between the base station 105-*b* and the UE 115-*b* may be performed in different orders or at different times. Certain operations may also be left out of the process flow 300, or other operations may be added. Although the base station 105-*b* and the UE 115-*b* are shown performing the operations of the process flow 300, some aspects of some operations may also be performed by one or more other wireless devices.

At 305, the UE 115-*b* may transmit one or more BFD reference signals to the base station 105-*b*. The BFD reference signals may include periodic SRSs. The UE 115-*b* may transmit the BFD reference signals using one or more uplink beams configured for communications by the UE 115-*b* (e.g., currently used uplink beams). In some examples, the base station 105-*b* may configure the one or more uplink beams for the set of BFD reference signals. Additionally or alternatively, the base station 105-*b* may configure the set of BFD reference signals with a usage set for uplink BFR. If the usage is set to uplink BFR, the UE 115-*b* may determine the one or more uplink beams based on corresponding PUCCH resources, as described with reference to FIG. 2.

The base station 105-*b* may receive the BFD reference signals and monitor a quality associated with the uplink beams. Alternatively, in some examples, the UE 115-*b* may transmit uplink signals via a PUCCH or a PUSCH using a set of uplink beams, and the base station 105-*b* may monitor a quality of the set of uplink beams used for the PUCCH transmission or the PUSCH transmission. At 310, the base station 105-*b* may detect an uplink beam failure. The base station 105-*b* may detect the uplink beam failure if a quality (e.g., a radio link quality) of the monitored uplink beams used for transmission and reception of the BFD reference signals (e.g., or the PUCCH or PUSCH transmissions) falls below a threshold value.

At 315, in response to detecting the uplink beam failure, the base station 105-*b* may transmit control signaling to the UE 115-*b* to trigger a candidate beam transmission. That is, the base station 105-*b* may trigger the UE 115-*b* to try one or more uplink beams that are different than the uplink beams used for transmission of the BFD reference signals. The one or more uplink beams may be included in a candidate set of uplink beams for the base station 105-*b* to select from. The control signaling may, in some examples, include DCI that schedules an uplink transmission, such as an aperiodic SRS transmission. However, the base station 105-*b* may not configure an uplink beam for the scheduled uplink transmission.

At 320, the UE 115-*b* may transmit the uplink reference signals based on the control signaling. The UE 115-*b* may autonomously select one or more uplink beams for transmitting the uplink reference signals. In one example, the UE 115-*b* may select the uplink beams based on which aperiodic SRS resources are transmitted. The UE 115-*b* may select a different uplink beam to use for transmission of each SRS resource. That is, each SRS resource may correspond to different uplink beams. The base station 105-*b* may receive the uplink reference signals transmitted using the set of uplink beams, and the base station 105-*b* may identify a quality of each uplink beam in the set.

At 325, the base station 105-*b* may identify one or more new uplink beams from the set of candidate uplink beams. The identified uplink beams may be preferred by the base station 105-*b* over the other candidate uplink beams (e.g., a best uplink beam). In some examples, the base station 105-*b* may identify an SRS resource that corresponds to the one or more uplink beams. At 330, the base station 105-*b* may transmit control signaling to the UE 115-*b*. The control signaling may include an uplink BFR response message, which may be an example of the uplink BFR response message described with reference to FIG. 2. The base station 105-*b* may transmit the control signaling based on detecting the uplink beam failure at 310.

The control signaling may indicate the one or more uplink beams for uplink communications by the UE 115-*b*. The one or more uplink beams may be decoupled from a downlink beam for downlink communications by the UE 115-*b*. That is, there may not be beam correspondence between the one or more uplink and downlink beams. The control signaling may include a DCI message or a MAC-CE configured to indicate the one or more uplink beams. The control signaling may indicate an SRS resource ID of an SRS resource corresponding to the one or more indicated uplink beams. The SRS resource ID may indicate that the UE 115-*b* is to use a same uplink beam as an uplink beam used for a most recent SRS transmission in the indicated SRS resource.

At 335, the UE 115-*b* may transmit a feedback message to the base station 105-*b*. The feedback message (e.g., an ACK message) may acknowledge the one or more uplink beams for the uplink communications based on receiving the control signaling. At 340, the UE 115-*b* may switch (or reset) uplink beams. That is, the UE 115-*b* may switch from the currently used uplink beams to the one or more uplink beams indicated via the uplink BFR message. The UE 115-b may switch uplink beams during a time period after receiving the control signaling. In some examples, the time period may occur after an ending symbol duration associated with receiving the control signaling. Additionally or alternatively, the time period may occur after an ending symbol duration associated with transmitting the feedback message. At 345, the UE 115-b may transmit uplink communications using the one or more uplink beams based on the feedback message. In some examples, the uplink communications may include PUSCH transmissions, PUCCH transmissions, SRS transmissions, PRACH transmissions, or any combination thereof. Alternatively, the uplink communications may include PUCCH, any PUSCH transmissions, PUSCH transmissions scheduled by a DCI format missing one or more of an SRI field or a TCI field, or any combination thereof.

As such, when there is no uplink and downlink beam correspondence, the base station 105-b may detect uplink beam failure, select one or more uplink beams, and transmit the uplink BFR message to indicate the one or more uplink beams to the UE 115-b. Such techniques for uplink BFR may provide for reduced latency and improved efficiency as compared to BFR procedures in which the UE 115-b identifies uplink beam failure based on downlink signals, or BFR procedures in which the base station 105-b configures a new uplink beam for each type of uplink communication.

Figure 4:
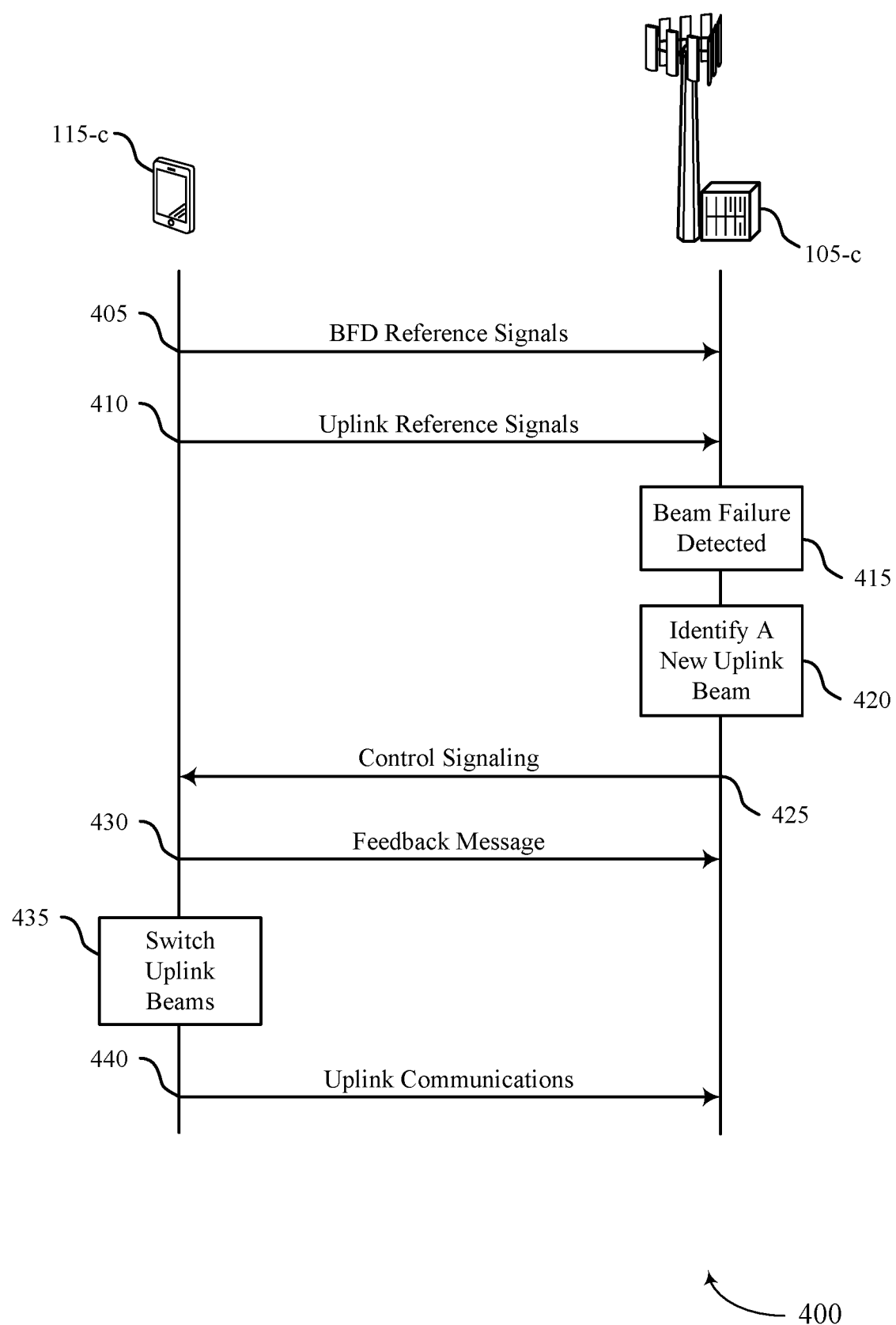

FIG. 4 illustrates an example of a process flow 400 that supports uplink BFR in accordance with aspects of the present disclosure. The process flow 400 may implement aspects of the wireless communications systems 100 and 200 or may be implemented by aspects of the wireless communications systems 100 and 200 as described with reference to FIGS. 1 and 2, respectively. For example, the process flow 400 may implement or be implemented by a base station 105-c and a UE 115-c, which may be examples of a base station 105 and UEs 115 as described with reference to FIGS. 1 through 3. In some examples, the process flow 400 may illustrate operations that may be performed in a second example of a BFD procedure described herein (e.g., Case 2). In the following description of the process flow 400, the operations between the base station 105-c and the UE 115-c may be performed in different orders or at different times. Certain operations may also be left out of the process flow 400, or other operations may be added. Although the base station 105-c and the UE 115-c are shown performing the operations of the process flow 400, some aspects of some operations may also be performed by one or more other wireless devices.

At 405, the UE 115-c may transmit one or more BFD reference signals to the base station 105-c. The BFD reference signals may include periodic SRSs. The UE 115-c may transmit the BFD reference signals using one or more uplink beams configured for communications by the UE 115-c (e.g., currently used uplink beams). In some examples, the base station 105-c may configure the one or more uplink beams for the set of BFD reference signals. Additionally or alternatively, the base station 105-c may configure the set of BFD reference signals with a usage set for uplink BFR. If the usage is set to uplink BFR, the UE 115-c may determine the one or more uplink beams based on corresponding PUCCH resources, as described with reference to FIG. 2.

The base station 105-c may receive the BFD reference signals and monitor a quality associated with the uplink beams to determine whether an uplink beam failure occurs. Alternatively, in some examples, the UE 115-c may transmit uplink signals via a PUCCH or a PUSCH using a set of uplink beams, and the base station 105-c may monitor a quality of the set of uplink beams used for the PUCCH transmission or the PUSCH transmission to detect beam failure. The BFD reference signals may represent an example of the BFD reference signals described with reference to FIG. 3.

At 410, the UE 115-c may transmit a second set of uplink reference signals to the base station 105-c. The second set of uplink reference signals may include periodic or semi-persistent SRSs. The UE 115-c may transmit the second set of uplink reference signals using a set of uplink beams selected by the UE 115-c. The set of uplink beams selected by the UE 115-c may include uplink beams that are different than the uplink beams used for transmitting the BFD reference signals (e.g., currently used uplink beams). The UE 115-c may select the set of uplink beams based on which periodic or semi-persistent SRS resources are transmitted. The UE 115-c may select a different uplink beam to use for transmission of each SRS resource. That is, if the UE 115-c transmits periodic SRS transmissions, a single SRS resource may be used for multiple periodic SRS transmissions via a same uplink beam, but other SRS resources may correspond to different uplink beams. The selected set of uplink beams may represent a candidate set of uplink beams for the base station 105-c to select from.

In some examples, the UE 115-c may transmit the second set of uplink reference signals and the BFD reference signals simultaneously, or at least partially overlapping in time, or some of the second set of uplink reference signals may be transmitted before or after some of the BFD reference signals in a time domain. The base station 105-c may receive the second set of uplink reference signals and the BFD reference signals simultaneously, at least partially overlapping in time, or within a relatively short time period from one another. The base station 105-c may monitor a quality associated with the BFD reference signals to detect beam failure, and the base station 105-c may monitor a second quality associated with the second set of uplink reference signals to identify a preferred uplink beam.

At 415, the base station 105-c may detect an uplink beam failure. The base station 105-c may detect the uplink beam failure if a quality (e.g., a radio link quality) of the monitored uplink beams used for transmitting the BFD reference signals falls below a threshold value. At 420, the base station 105-c may identify a new uplink beam from the set of candidate uplink beams used to transmit the second set of uplink reference signals. The identified uplink beam may be an uplink beam that is preferred by the base station 105-c. In some examples, the base station 105-c may identify an SRS resource that corresponds to a preferred uplink beam. A time period between detecting the uplink beam failure and identifying the new uplink beam may be shorter in the example of FIG. 4 (e.g., BFD Case 2) than in the example of FIG. 3 (e.g., BFD Case 1) because the base station 105-c may receive the second set of uplink reference signals using the candidate set of uplink beams prior to detecting the uplink beam failure in the example of FIG. 4 (e.g., the base station 105-c may refrain from triggering candidate beam transmissions).

At 425, the base station 105-c may transmit control signaling to the UE 115-c. The control signaling may include an uplink BFR response message, which may be an example of the uplink BFR response message described with reference to FIGS. 2 and 3. The base station 105-c may transmit the control signaling based on detecting the uplink beam failure, at 415. The control signaling may indicate one or more uplink beams for uplink communications by the UE 115-c. The one or more uplink beams may be decoupled from a downlink beam for downlink communications by the UE 115-c. That is, there may not be beam correspondence between the one or more uplink and downlink beams. The control signaling may include a DCI or a MAC-CE configured to indicate the one or more uplink beams. The control signaling may indicate an SRS resource ID corresponding to one of the SRS resources transmitted using the selected uplink beam. The SRS resource ID may indicate that the UE 115-c is to use a same uplink beam as an uplink beam used for a recent SRS transmission in the indicated SRS resource.

At 430, the UE 115-c may transmit a feedback message to the base station 105-c. The feedback message (e.g., an ACK message) may acknowledge the one or more uplink beams for the uplink communications based on receiving the control signaling. At 435, the UE 115-c may switch (or reset) uplink beams. That is, the UE 115-c may switch from the currently used uplink beams to the one or more uplink beams indicated via the uplink BFR message. The UE 115-c may switch uplink beams during a time period after receiving the control signaling. In some examples, the time period may occur after an ending symbol duration associated with receiving the control signaling. Alternatively, the time period may occur after an ending symbol duration associated with transmitting the feedback message. At 440, the UE 115-c may transmit uplink communications using the one or more uplink beams based on the feedback message. In some examples, the uplink communications may include PUSCH transmissions, PUCCH transmissions, SRS transmissions, PRACH transmissions, or any combination thereof. Alternatively, the uplink communications may include PUCCH, any PUSCH transmissions, PUSCH transmissions scheduled by a DCI format missing one or more of an SRI field or a TCI field, or any combination thereof.

As such, when there is no uplink and downlink beam correspondence, the base station 105-c may detect beam failure, select the one or more uplink beams, and transmit the uplink BFR message to indicate the one or more uplink beams to the UE 115-c. The base station 105-c may detect uplink beam failure based on a set of uplink beams used by the UE 115-c to transmit BFD reference signals, and the base station 105-c may select an uplink beam from a candidate set of uplink beams used by the UE 115-c to transmit a set of uplink reference signals. The BFD reference signals and the uplink reference signals may be transmitted prior to detection of the beam failure, which may reduce latency associated with the uplink BFR procedures. Such techniques for uplink BFR may provide for reduced latency and improved efficiency as compared to BFR procedures in which the UE 115-c identifies uplink beam failure based on downlink signals, or BFR procedures in which the base station 105-c configures a new uplink beam for each type of uplink communication.

Figure 5:
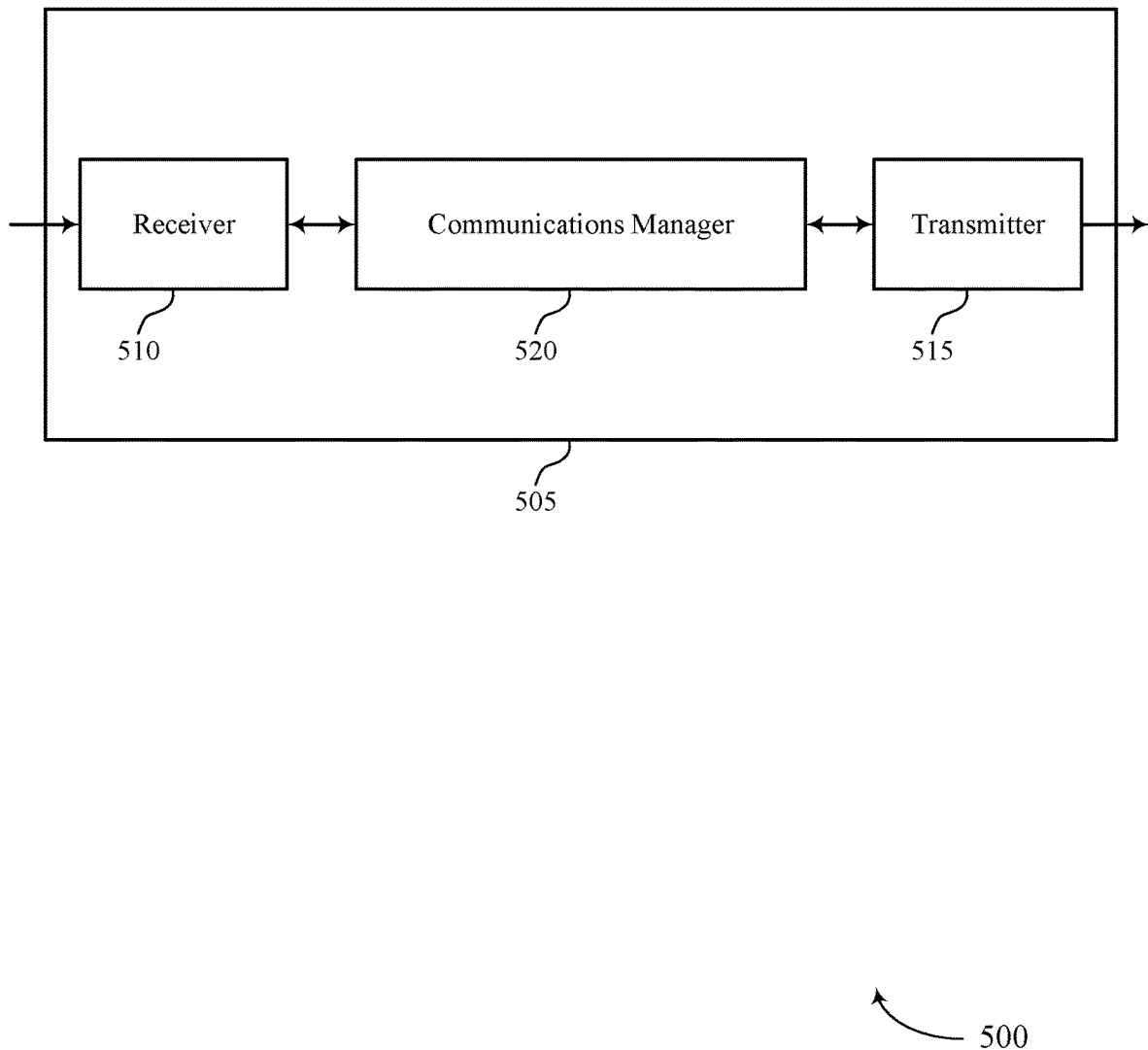
FIGS. 5 and 6 show block diagrams of devices that support uplink BFR in accordance with aspects of the present disclosure.

FIG. 5 shows a block diagram 500 of a device 505 that supports uplink BFR in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to uplink BFR). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to uplink BFR). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of uplink BFR as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a device 505 (e.g., a UE) in accordance with examples as disclosed herein. For example, the communications manager 520 may be configured as or otherwise support a means for receiving control signaling based on an uplink beam failure, the control signaling indicating one or more uplink beams for uplink communications, the one or more uplink beams for the uplink communications being decoupled from a downlink beam for downlink communications. The communications manager 520 may be configured as or otherwise support a means for transmitting a feedback message acknowledging the one or more uplink beams for the uplink communications based on the control signaling. The communications manager 520 may be configured as or otherwise support a means for transmitting the uplink communications using the one or more uplink beams based on the feedback message.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing and reduced latency. By receiving an uplink BFR message indicating uplink beam failure and one or more uplink beams for recovering from the uplink beam failure, the processor may refrain from detecting uplink beam failure or selecting new uplink beams (e.g., based on downlink signals) when there is no uplink and downlink beam correspondence, which may improve reliability of communications and reduce processing. The uplink BFR message may additionally or alternatively indicate an uplink beam for the device 505 to use prior to reception of a control signal that configures spatial relation information for the device 505, which may reduce latency and processing. In some examples, the device 505 may be configured with one or more SRS resource sets configured for uplink BFR procedures. The processor of the device 505 may select uplink beams for transmitting the SRS resources without receiving control signaling from a base station, which may further reduce processing and latency.

Figure 6:
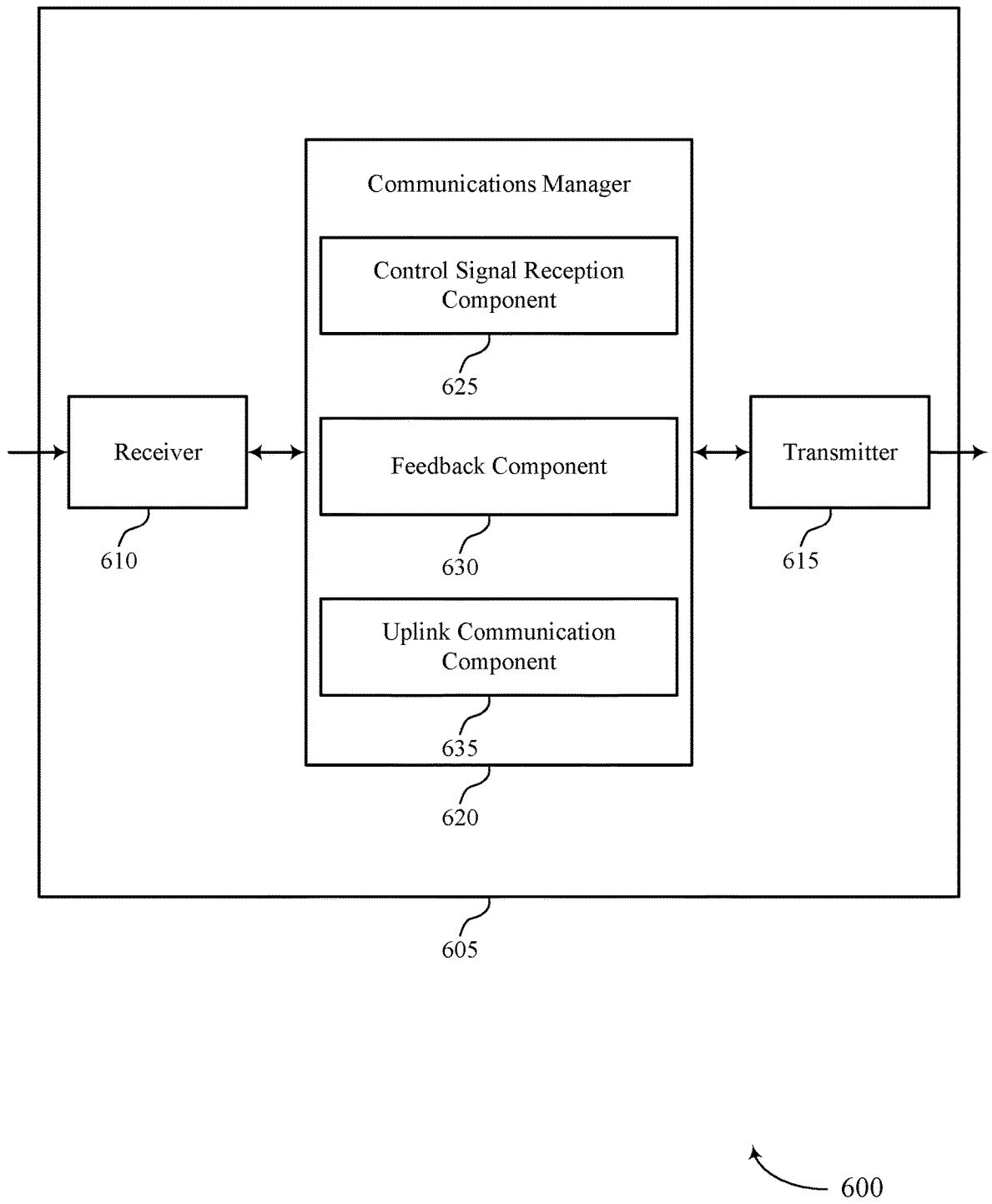

FIG. 6 shows a block diagram 600 of a device 605 that supports uplink BFR in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to uplink BFR). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to uplink BFR). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of uplink BFR as described herein. For example, the communications manager 620 may include a control signal reception component 625, a feedback component 630, an uplink communication component 635, or any combination thereof.

The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at the device 605 (e.g., a UE) in accordance with examples as disclosed herein. The control signal reception component 625 may be configured as or otherwise support a means for receiving control signaling based on an uplink beam failure, the control signaling indicating one or more uplink beams for uplink communications, the one or more uplink beams for the uplink communications being decoupled from a downlink beam for downlink communications. The feedback component 630 may be configured as or otherwise support a means for transmitting a feedback message acknowledging the one or more uplink beams for the uplink communications based on the control signaling. The uplink communication component 635 may be configured as or otherwise support a means for transmitting the uplink communications using the one or more uplink beams based on the feedback message.

Figure 7:
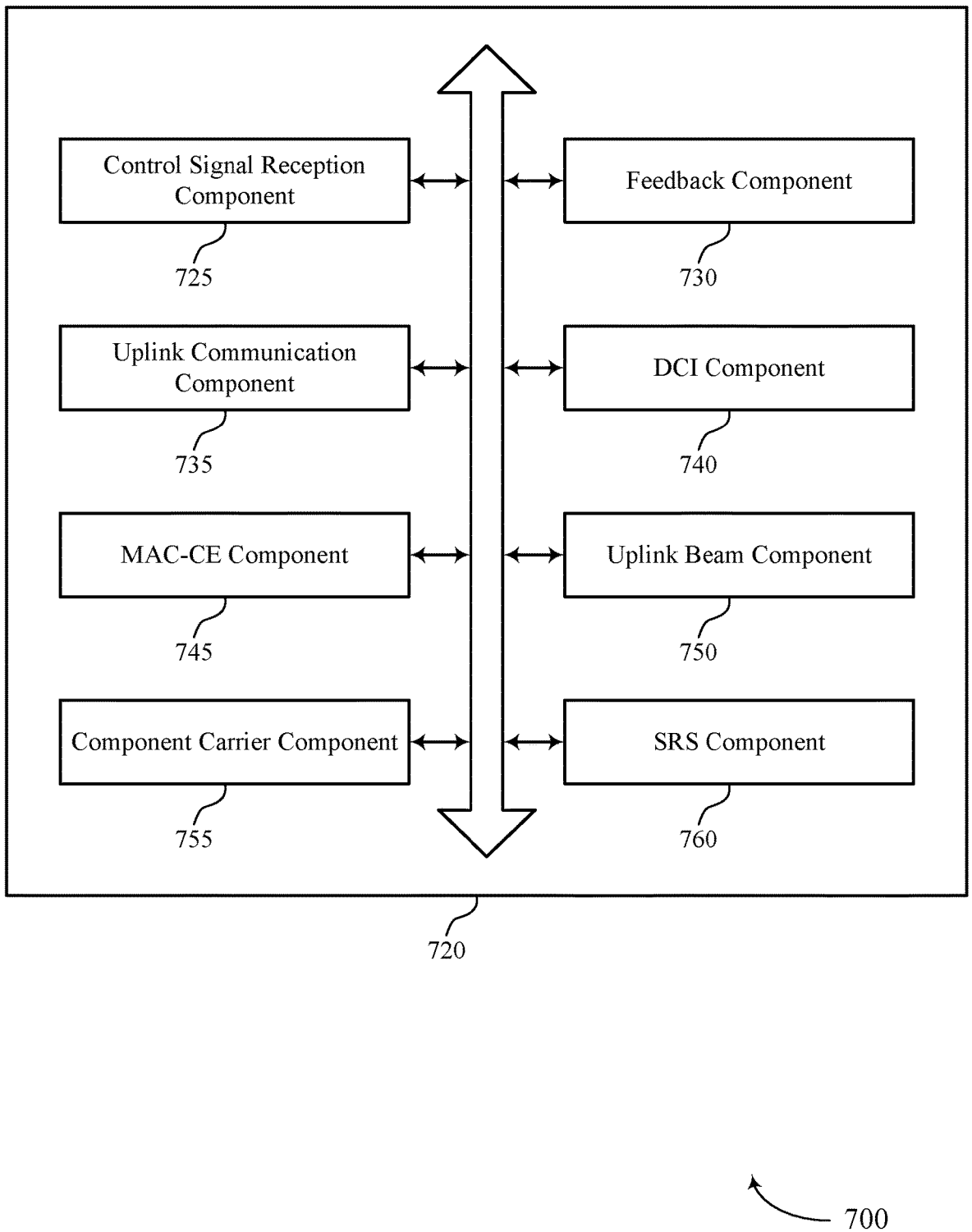
FIG. 7 shows a block diagram of a communications manager that supports uplink BFR in accordance with aspects of the present disclosure.

FIG. 7 shows a block diagram 700 of a communications manager 720 that supports uplink BFR in accordance with aspects of the present disclosure. The communications manager 720 may be an example of aspects of a communications manager 520, a communications manager 620, or both, as described herein. The communications manager 720, or various components thereof, may be an example of means for performing various aspects of uplink BFR as described herein. For example, the communications manager 720 may include a control signal reception component 725, a feedback component 730, an uplink communication component 735, a DCI component 740, a MAC-CE component 745, an uplink beam component 750, a component carrier component 755, an SRS component 760, or any combination thereof. Each of these components may communicate, directly or indirectly, with one another (e.g., via one or more buses).

The communications manager 720 may support wireless communication at a UE in accordance with examples as disclosed herein. The control signal reception component 725 may be configured as or otherwise support a means for receiving control signaling based on an uplink beam failure, the control signaling indicating one or more uplink beams for uplink communications, the one or more uplink beams for the uplink communications being decoupled from a downlink beam for downlink communications. The feedback component 730 may be configured as or otherwise support a means for transmitting a feedback message acknowledging the one or more uplink beams for the uplink communications based on the control signaling. The uplink communication component 735 may be configured as or otherwise support a means for transmitting the uplink communications using the one or more uplink beams based on the feedback message. In some examples, the one or more uplink beams for the uplink communications being decoupled from the downlink beam for the downlink communications indicates an absence of a beam correspondence between the one or more uplink beams and the downlink beam.

In some examples, to support receiving the control signaling, the DCI component 740 may be configured as or otherwise support a means for receiving a DCI message including a set of DCI fields, a first DCI field of the set of DCI fields indicating the one or more uplink beams for the uplink communications. In some examples, the component carrier component 755 may be configured as or otherwise support a means for determining an uplink component carrier associated with the one or more uplink beams based on a second DCI field of the set of DCI fields indicating the uplink component carrier. In some examples, transmitting the uplink communications is based on the uplink component carrier. In some examples, receiving the DCI message is based on one or more of an RNTI, a format of the DCI message, a reserved value of one or more DCI fields of the DCI message, a search space set associated with the DCI message, or a CORESET associated with the DCI message.

In some examples, the feedback component 730 may be configured as or otherwise support a means for determining a grant scheduling one or more of the downlink communications or the uplink communications based on the DCI message, the downlink communications including a PDSCH transmission, the uplink communications including a PUSCH transmission. In some examples, transmitting the feedback message is based on one or more of the PDSCH transmission or the PUSCH transmission. In some examples, the feedback component 730 may be configured as or otherwise support a means for determining an uplink resource to transmit the feedback message based on a subset of DCI fields of the set of DCI fields associated with the DCI message. In some examples, transmitting the feedback message is based on the uplink resource.

In some examples, to support receiving the control signaling, the MAC-CE component 745 may be configured as or otherwise support a means for receiving a MAC-CE including a set of MAC-CE fields, a first MAC-CE field of the set of MAC-CE fields indicating the one or more uplink beams for the uplink communications. In some examples, transmitting the feedback message is based on the MAC-CE. In some examples, the component carrier component 755 may be configured as or otherwise support a means for determining an uplink component carrier based on a second MAC-CE field of the set of MAC-CE fields indicating the uplink component carrier. In some examples, transmitting the uplink communications is based on the uplink component carrier. In some examples, a subset of MAC-CE fields of the set of MAC-CE fields each indicate a respective uplink beam failure of a respective uplink beam associated with a respective uplink component carrier of the UE. In some examples, the control signaling indicates an SRS resource identifier corresponding to at least one SRS resource of a set of SRS resources, the at least one SRS resource corresponding to the one or more uplink beams.

In some examples, the uplink beam component 750 may be configured as or otherwise support a means for switching to the one or more uplink beams based on the control signaling indicating the one or more uplink beams for the uplink communications. In some examples, transmitting the uplink communications may be based on switching to the one or more uplink beams, the uplink communications including one or more of a PUCCH transmission, a PUSCH transmission, an SRS transmission, or a PRACH transmission. In some examples, to support receiving the control signaling, the DCI component 740 may be configured as or otherwise support a means for receiving a DCI message scheduling the uplink communications. In some examples, to support receiving the control signaling, the uplink beam component 750 may be configured as or otherwise support a means for switching to the one or more uplink beams for the uplink communications based on the DCI message satisfying a DCI format, the DCI message missing one or more DCI fields associated with one or more of an SRI field or a TCI field. In some examples, transmitting the uplink communications is based on switching to the one or more uplink beams, the uplink communications including one or more of a PUCCH transmission or a PUSCH transmission.

In some examples, the uplink beam component 750 may be configured as or otherwise support a means for switching to the one or more uplink beams for the uplink communications on one or more uplink component carriers. In some examples, the one or more uplink component carriers include one or more of an uplink component carrier indicated via the control signaling, or uplink component carriers in a same radio frequency spectrum band as the uplink component carrier. In some examples, the uplink beam component 750 may be configured as or otherwise support a means for switching to the one or more uplink beams during a time period after receiving the control signaling indicating the one or more uplink beams for the uplink communications. In some examples, transmitting the uplink communications is based on switching to the one or more uplink beams during the time period after receiving the control signaling. In some examples, the time period occurs after an ending symbol duration associated with receiving the control signaling. In some examples, the time period occurs after an ending symbol duration associated with transmitting the feedback message. In some examples, the time period occurs during a subsequent TTI.

In some examples, the SRS component 760 may be configured as or otherwise support a means for determining a set of SRS resources to use for uplink BFR based on a configuration. In some examples, the SRS component 760 may be configured as or otherwise support a means for transmitting a set of SRSs based on the set of SRS resources and a set of uplink beams. In some examples, receiving the control signaling indicating the one or more uplink beams for the uplink communications is based on the set of SRS resources, at least one SRS resource of the set of SRS resources corresponding to the one or more uplink beams. In some examples, the uplink beam component 750 may be configured as or otherwise support a means for selecting the set of uplink beams based on one or more second uplink beams associated with an uplink control channel or one or more third uplink beams associated with uplink control resource IDs, where transmitting the set of SRSs is based on the selecting of the set of uplink beams.

Figure 8:
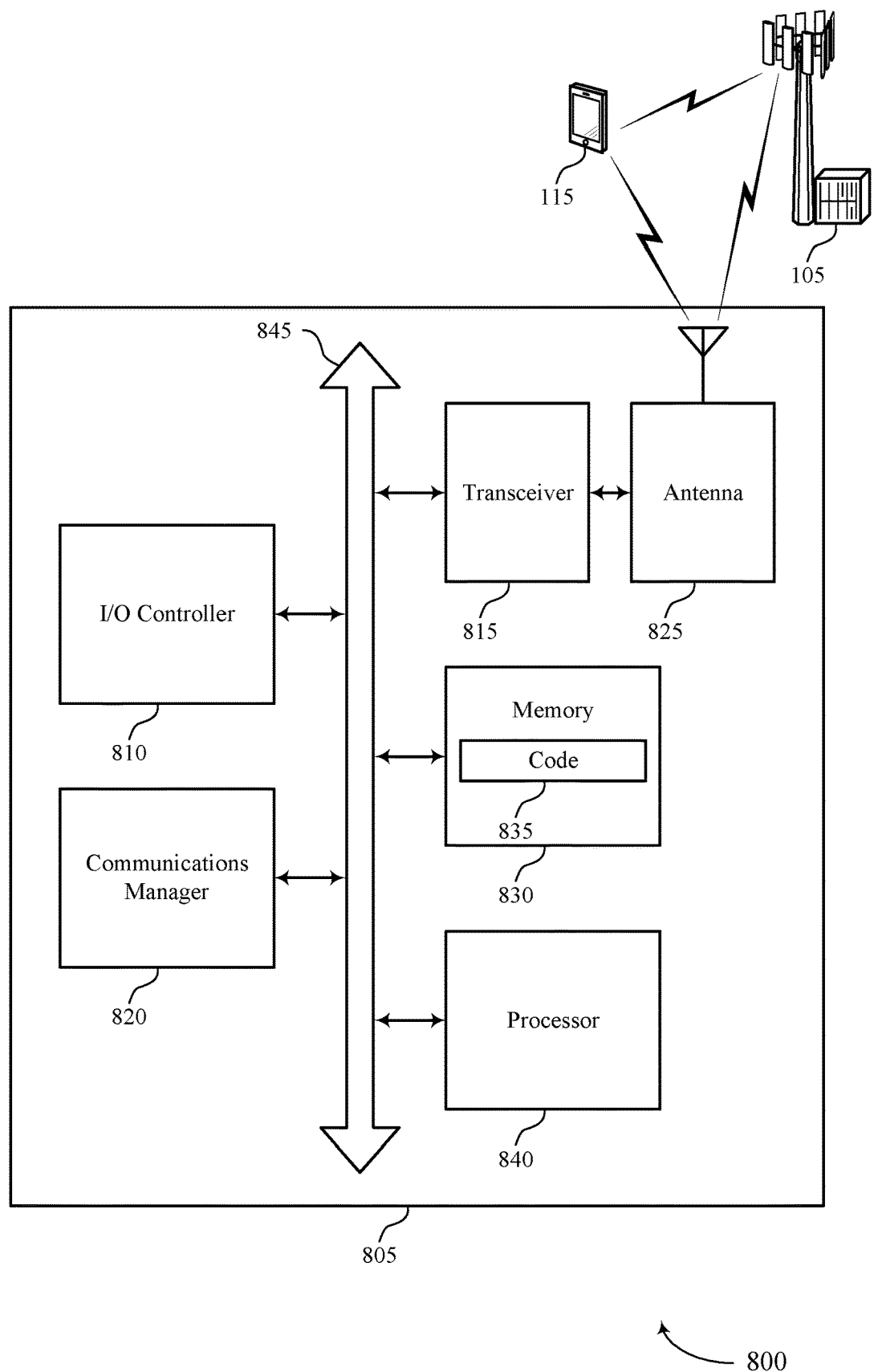
FIG. 8 shows a diagram of a system including a device that supports uplink BFR in accordance with aspects of the present disclosure.

FIG. 8 shows a diagram of a system 800 including a device 805 that supports uplink BFR in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic input/output system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting uplink BFR). For example, the device 805 or a component of the device 805 may include a processor 840 and memory 830 coupled to the processor 840, the processor 840 and memory 830 configured to perform various functions described herein.

The communications manager 820 may support wireless communication at device 805 (e.g., a UE) in accordance with examples as disclosed herein. For example, the communications manager 820 may be configured as or otherwise support a means for receiving control signaling based on an uplink beam failure, the control signaling indicating one or more uplink beams for uplink communications, the one or more uplink beams for the uplink communications being decoupled from a downlink beam for downlink communications. The communications manager 820 may be configured as or otherwise support a means for transmitting a feedback message acknowledging the one or more uplink beams for the uplink communications based on the control signaling. The communications manager 820 may be configured as or otherwise support a means for transmitting the uplink communications using the one or more uplink beams based on the feedback message.

By including or configuring the communications manager 820 in accordance with examples as described herein, the device 805 may support techniques for improved communication reliability, reduced latency, reduced power consumption, and improved coordination between devices. The device 805 may receive an uplink BFR message indicating one or more uplink beams for the device 805 to switch to after an uplink beam failure. By performing uplink BFR based on the uplink BFR message, the device 805 may reduce latency and improve communication reliability as compared with uplink BFR procedures in which the device 805 detects uplink beam failure based on downlink signals. The uplink BFR message may indicate an uplink beam that is preferred by a base station for subsequent transmissions to recover from the uplink beam failure, which may improve coordination between devices and improve communication reliability. In some examples, the device 805 may be configured with one or more SRS resource sets configured for uplink BFR procedures. The device 805 may select uplink beams for transmitting the SRS resources without receiving control signaling from a base station, which may reduce latency.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of uplink BFR as described herein, or the processor 840 and the memory 830 may be otherwise configured to perform or support such operations.

Figure 9:
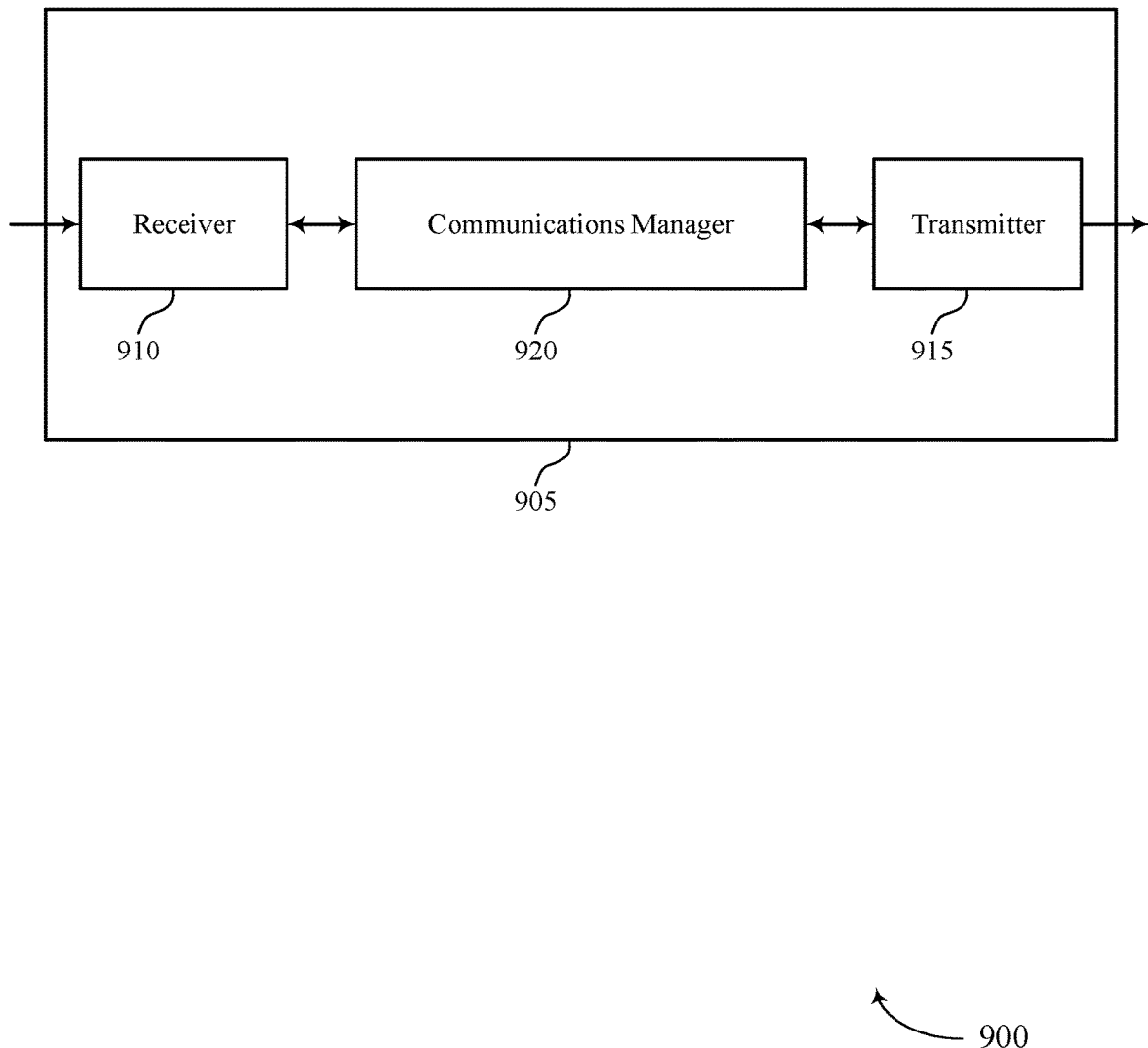
FIGS. 9 and 10 show block diagrams of devices that support uplink BFR in accordance with aspects of the present disclosure.

FIG. 9 shows a block diagram 900 of a device 905 that supports uplink BFR in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to uplink BFR). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to uplink BFR). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of uplink BFR as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for transmitting control signaling based on an uplink beam failure, the control signaling indicating one or more uplink beams for uplink communications, the one or more uplink beams for the uplink communications being decoupled from a downlink beam for downlink communications. The communications manager 920 may be configured as or otherwise support a means for receiving a feedback message acknowledging the one or more uplink beams for the uplink communications based on the control signaling. The communications manager 920 may be configured as or otherwise support a means for receiving the uplink communications using the one or more uplink beams based on the feedback message.

Figure 10:
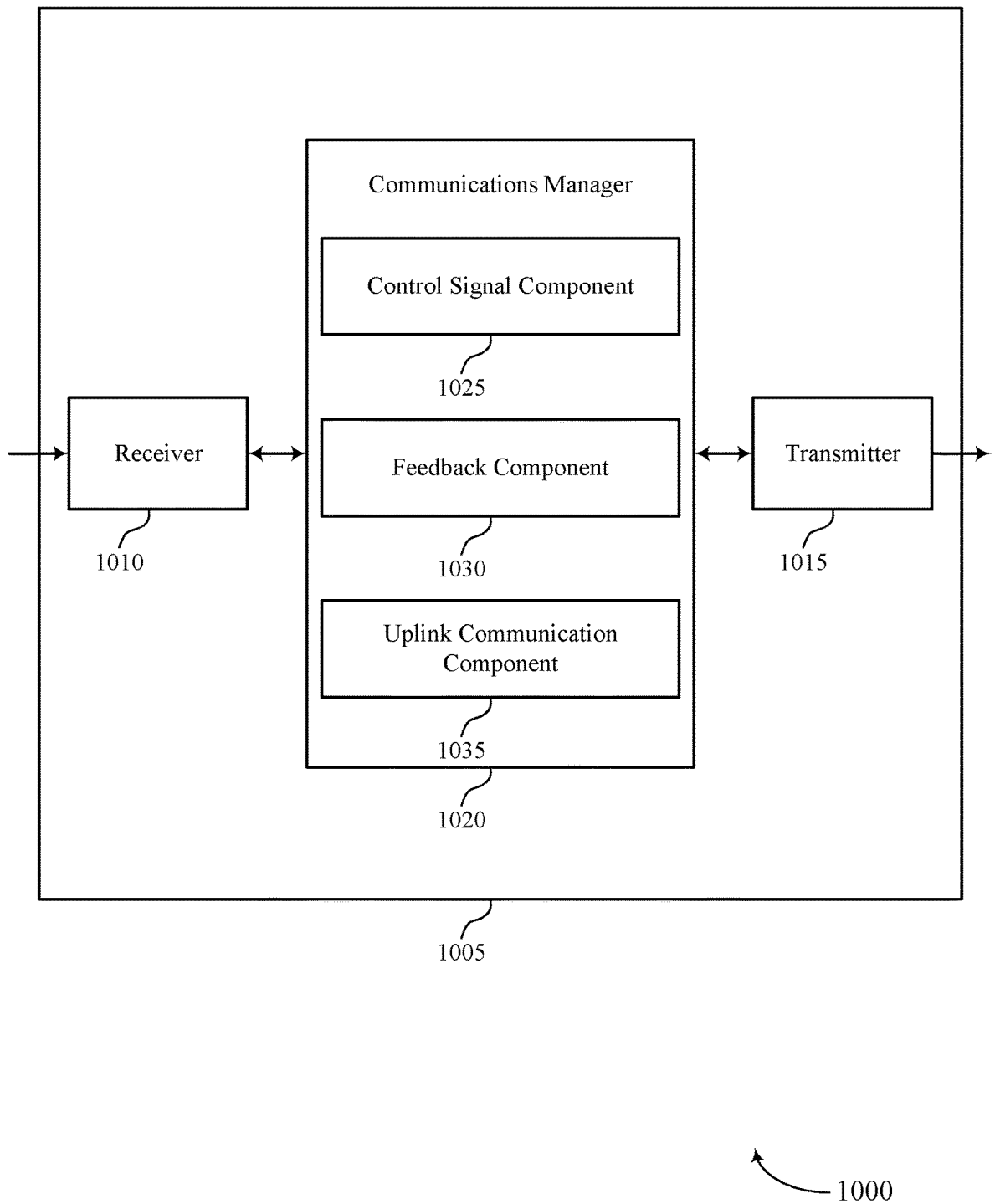

FIG. 10 shows a block diagram 1000 of a device 1005 that supports uplink BFR in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to uplink BFR). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to uplink BFR). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of uplink BFR as described herein. For example, the communications manager 1020 may include a control signal component 1025, a feedback component 1030, an uplink communication component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The control signal component 1025 may be configured as or otherwise support a means for transmitting control signaling based on an uplink beam failure, the control signaling indicating one or more uplink beams for uplink communications, the one or more uplink beams for the uplink communications being decoupled from a downlink beam for downlink communications. The feedback component 1030 may be configured as or otherwise support a means for receiving a feedback message acknowledging the one or more uplink beams for the uplink communications based on the control signaling. The uplink communication component 1035 may be configured as or otherwise support a means for receiving the uplink communications using the one or more uplink beams based on the feedback message.

Figure 11:
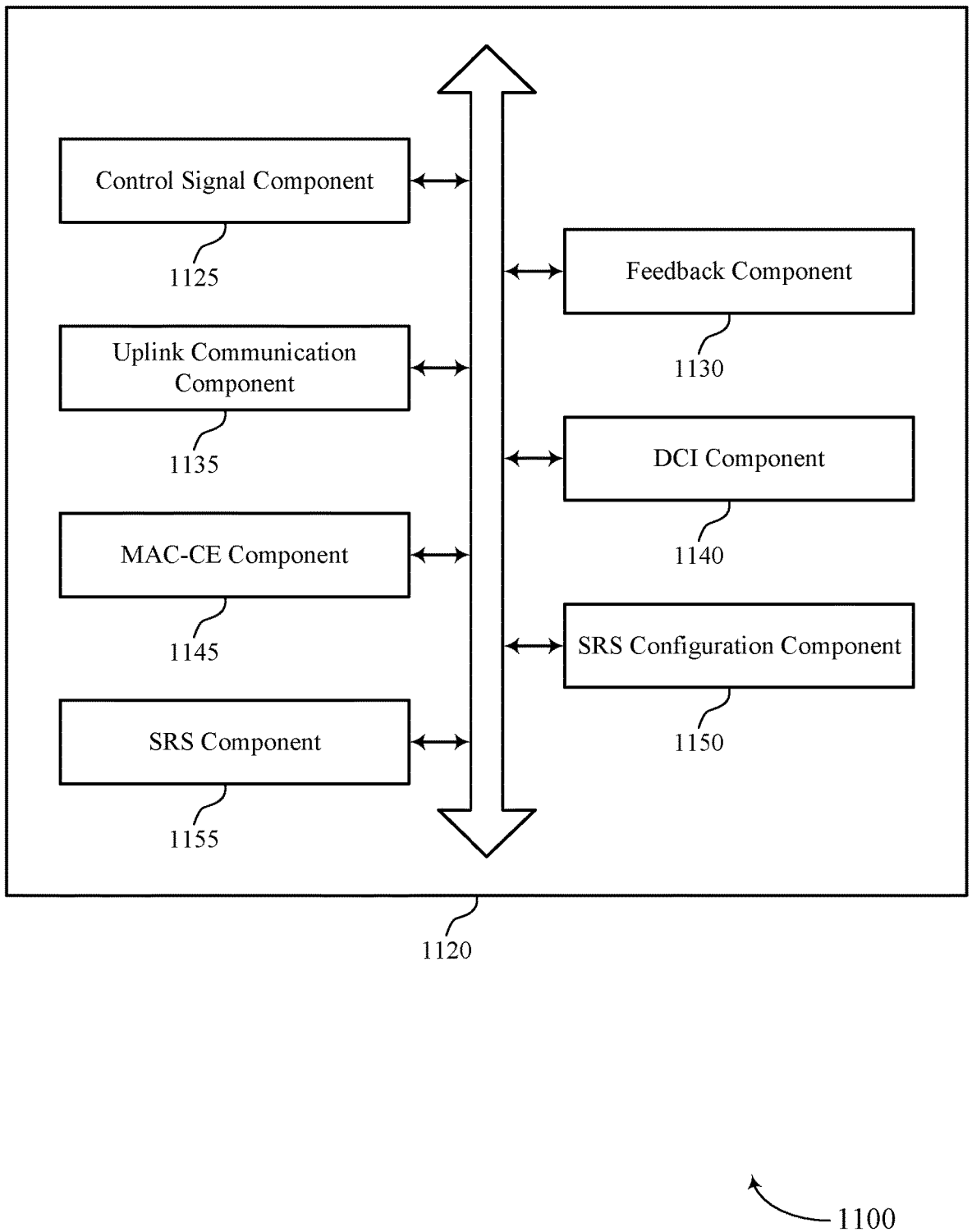
FIG. 11 shows a block diagram of a communications manager that supports uplink BFR in accordance with aspects of the present disclosure.

FIG. 11 shows a block diagram 1100 of a communications manager 1120 that supports uplink BFR in accordance with aspects of the present disclosure. The communications manager 1120 may be an example of aspects of a communications manager 920, a communications manager 1020, or both, as described herein. The communications manager 1120, or various components thereof, may be an example of means for performing various aspects of uplink BFR as described herein. For example, the communications manager 1120 may include a control signal component 1125, a feedback component 1130, an uplink communication component 1135, a DCI component 1140, a MAC-CE component 1145, an SRS configuration component 1150, an SRS component 1155, or any combination thereof. Each of these components may communicate, directly or indirectly, with one another (e.g., via one or more buses).

The communications manager 1120 may support wireless communication at a base station in accordance with examples as disclosed herein. The control signal component 1125 may be configured as or otherwise support a means for transmitting control signaling based on an uplink beam failure, the control signaling indicating one or more uplink beams for uplink communications, the one or more uplink beams for the uplink communications being decoupled from a downlink beam for downlink communications. The feedback component 1130 may be configured as or otherwise support a means for receiving a feedback message acknowledging the one or more uplink beams for the uplink communications based on the control signaling. The uplink communication component 1135 may be configured as or otherwise support a means for receiving the uplink communications using the one or more uplink beams based on the feedback message. In some examples, the one or more uplink beams for the uplink communications being decoupled from the downlink beam for the downlink communications indicates an absence of a beam correspondence between the one or more uplink beams and the downlink beam.

In some examples, to support transmitting the control signaling, the DCI component 1140 may be configured as or otherwise support a means for transmitting a DCI message including a set of DCI fields, a first DCI field of the set of DCI fields indicating the one or more uplink beams for the uplink communications. In some examples, a second DCI field of the set of DCI fields indicates an uplink component carrier associated with the one or more uplink beams. In some examples, the DCI message corresponds to on one or more of an RNTI, a format of the DCI message, a reserved value of one or more DCI fields of the DCI message, a search space set associated with the DCI message, or a CORESET associated with the DCI message. In some examples, the DCI message includes a grant scheduling one or more of the downlink communications or the uplink communications, the downlink communications including a PDSCH transmission, the uplink communications including a PUSCH transmission. In some examples, receiving the feedback message is based on one or more of the PDSCH transmission or the PUSCH transmission. In some examples, to support transmitting the control signaling, the MAC-CE component 1145 may be configured as or otherwise support a means for transmitting a MAC-CE including a set of MAC-CE fields, a first MAC-CE field of the set of MAC-CE fields indicating the one or more uplink beams for the uplink communications. In some examples, receiving the feedback message is based on the MAC-CE.

In some examples, the SRS configuration component 1150 may be configured as or otherwise support a means for transmitting a configuration indicating a set of SRS resources to use for uplink BFR. In some examples, the SRS component 1155 may be configured as or otherwise support a means for receiving a set of SRSs based on the set of SRS resources and a set of uplink beams. In some examples, transmitting the control signaling indicating the one or more uplink beams for the uplink communications is based on the set of SRS resources, at least one SRS resource of the set of SRS resources corresponding to the one or more uplink beams.

Figure 12:
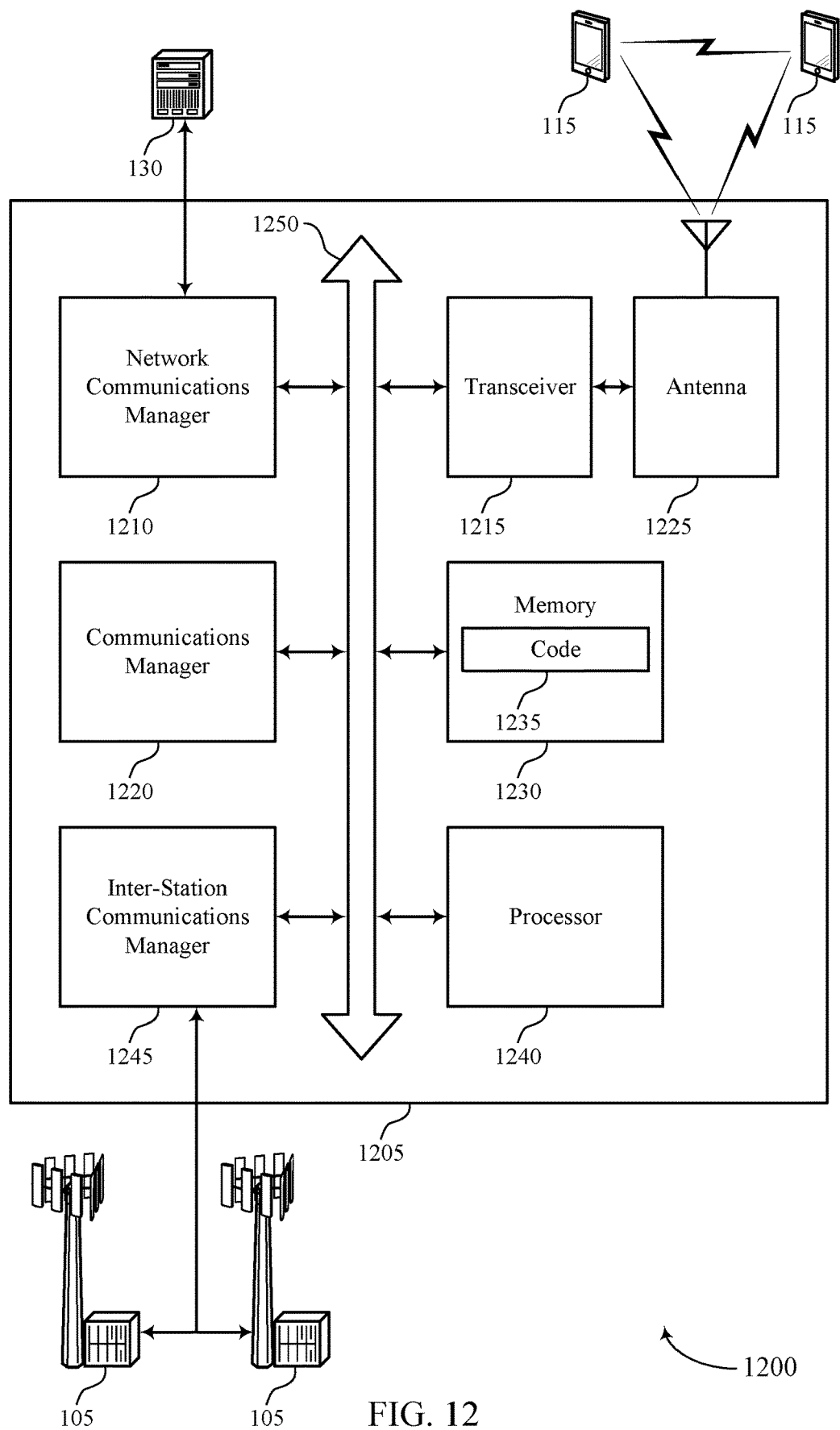
FIG. 12 shows a diagram of a system including a device that supports uplink BFR in accordance with aspects of the present disclosure.

FIG. 12 shows a diagram of a system 1200 including a device 1205 that supports uplink BFR in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting uplink BFR). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for transmitting control signaling based on an uplink beam failure, the control signaling indicating one or more uplink beams for uplink communications, the one or more uplink beams for the uplink communications being decoupled from a downlink beam for downlink communications. The communications manager 1220 may be configured as or otherwise support a means for receiving a feedback message acknowledging the one or more uplink beams for the uplink communications based on the control signaling. The communications manager 1220 may be configured as or otherwise support a means for receiving the uplink communications using the one or more uplink beams based on the feedback message.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of uplink BFR as described herein, or the processor 1240 and the memory 1230 may be otherwise configured to perform or support such operations.

Figure 13:
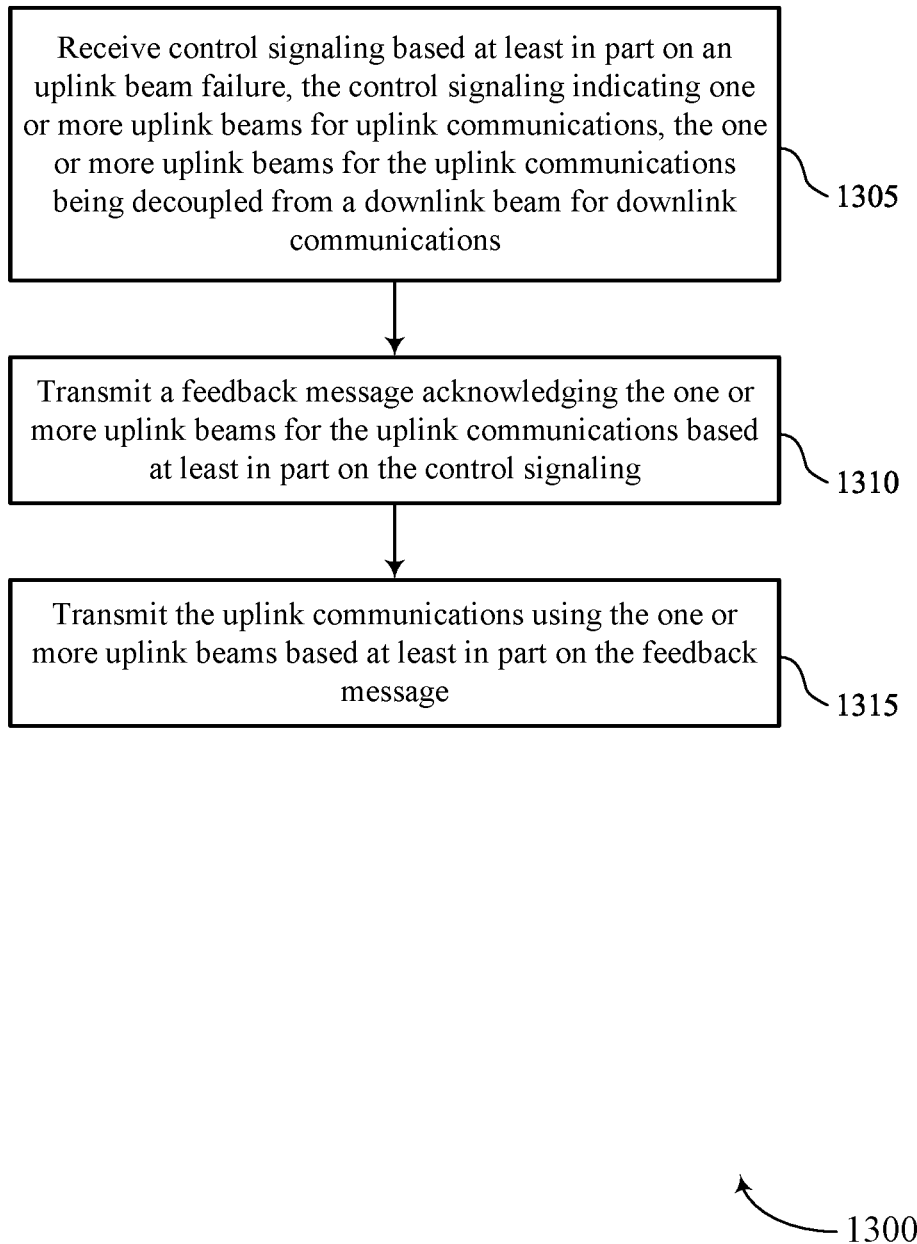
FIGS. 13 through 15 show flowcharts illustrating methods that support uplink BFR in accordance with aspects of the present disclosure.

FIG. 13 shows a flowchart illustrating a method 1300 that supports uplink BFR in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving control signaling based on an uplink beam failure, the control signaling indicating one or more uplink beams for uplink communications, the one or more uplink beams for the uplink communications being decoupled from a downlink beam for downlink communications. The operations of 1305 may be performed in accordance with examples as disclosed herein. In some examples, aspects of the operations of 1305 may be performed by a control signal reception component 725 as described with reference to FIG. 7.

At 1310, the method may include transmitting a feedback message acknowledging the one or more uplink beams for the uplink communications based on the control signaling. The operations of 1310 may be performed in accordance with examples as disclosed herein. In some examples, aspects of the operations of 1310 may be performed by a feedback component 730 as described with reference to FIG. 7.

At 1315, the method may include transmitting the uplink communications using the one or more uplink beams based on the feedback message. The operations of 1315 may be performed in accordance with examples as disclosed herein. In some examples, aspects of the operations of 1315 may be performed by an uplink communication component 735 as described with reference to FIG. 7.

Figure 14:
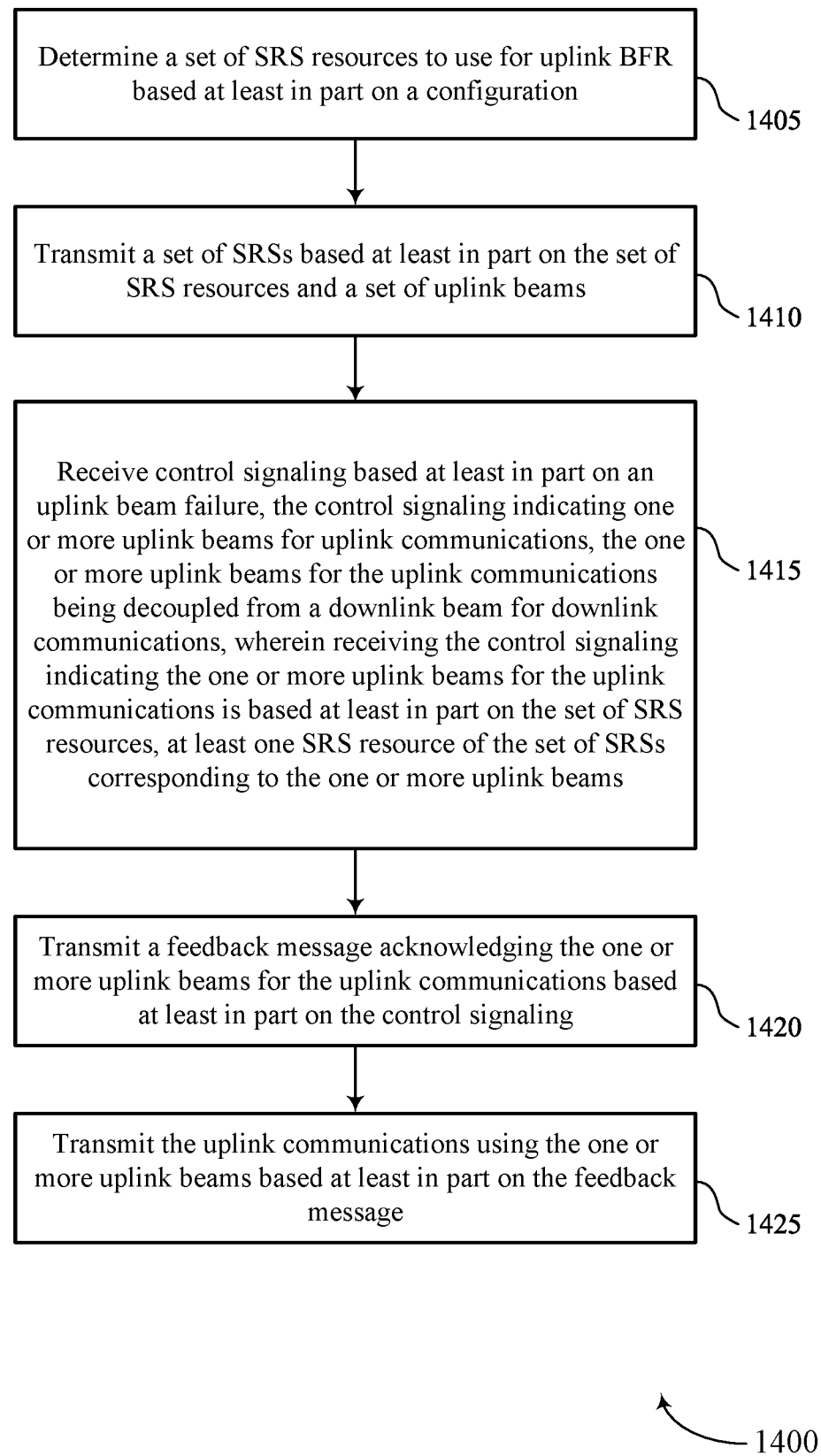

FIG. 14 shows a flowchart illustrating a method 1400 that supports uplink BFR in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include determining a set of SRS resources to use for uplink BFR based on a configuration. The operations of 1405 may be performed in accordance with examples as disclosed herein. In some examples, aspects of the operations of 1405 may be performed by an SRS component 760 as described with reference to FIG. 7.

At 1410, the method may include transmitting a set of SRSs based on the set of SRS resources and a set of uplink beams. The operations of 1410 may be performed in accordance with examples as disclosed herein. In some examples, aspects of the operations of 1410 may be performed by an SRS component 760 as described with reference to FIG. 7.

At 1415, the method may include receiving control signaling based on an uplink beam failure, the control signaling indicating one or more uplink beams for uplink communications, the one or more uplink beams for the uplink communications being decoupled from a downlink beam for downlink communications. In some examples, receiving the control signaling indicating the one or more uplink beams for the uplink communications may be based on the set of SRS resources, at least one SRS resource of the set of SRS resources corresponding to the one or more uplink beams. The operations of 1415 may be performed in accordance with examples as disclosed herein. In some examples, aspects of the operations of 1415 may be performed by a control signal reception component 725 as described with reference to FIG. 7.

At 1420, the method may include transmitting a feedback message acknowledging the one or more uplink beams for the uplink communications based on the control signaling. The operations of 1420 may be performed in accordance with examples as disclosed herein. In some examples, aspects of the operations of 1420 may be performed by a feedback component 730 as described with reference to FIG. 7.

At 1425, the method may include transmitting the uplink communications using the one or more uplink beams based on the feedback message. The operations of 1425 may be performed in accordance with examples as disclosed herein. In some examples, aspects of the operations of 1425 may be performed by an uplink communication component 735 as described with reference to FIG. 7.

Figure 15:
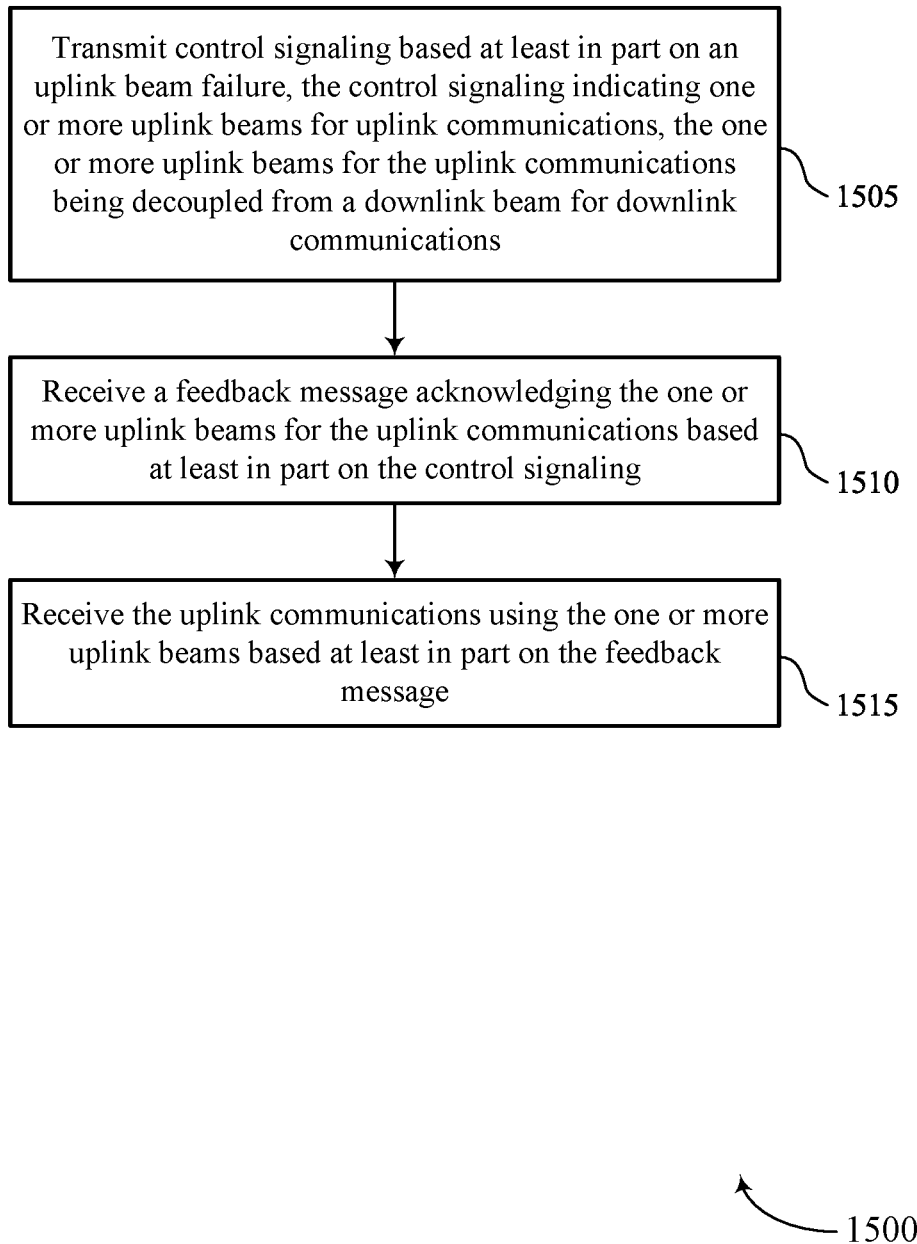

FIG. 15 shows a flowchart illustrating a method 1500 that supports uplink BFR in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include transmitting control signaling based on an uplink beam failure, the control signaling indicating one or more uplink beams for uplink communications, the one or more uplink beams for the uplink communications being decoupled from a downlink beam for downlink communications. The operations of 1505 may be performed in accordance with examples as disclosed herein. In some examples, aspects of the operations of 1505 may be performed by a control signal component 1125 as described with reference to FIG. 11.

At 1510, the method may include receiving a feedback message acknowledging the one or more uplink beams for the uplink communications based on the control signaling. The operations of 1510 may be performed in accordance with examples as disclosed herein. In some examples, aspects of the operations of 1510 may be performed by a feedback component 1130 as described with reference to FIG. 11.

At 1515, the method may include receiving the uplink communications using the one or more uplink beams based on the feedback message. The operations of 1515 may be performed in accordance with examples as disclosed herein. In some examples, aspects of the operations of 1515 may be performed by an uplink communication component 1135 as described with reference to FIG. 11.

The following provides an overview of aspects of the present disclosure:

Aspect 1: A method for wireless communication at a UE, comprising: receiving control signaling based at least in part on an uplink beam failure, the control signaling indicating one or more uplink beams for uplink communications, the one or more uplink beams for the uplink communications being decoupled from a downlink beam for downlink communications; transmitting a feedback message acknowledging the one or more uplink beams for the uplink communications based at least in part on the control signaling; and transmitting the uplink communications using the one or more uplink beams based at least in part on the feedback message.

Aspect 2: The method of aspect 1, wherein the one or more uplink beams for the uplink communications being decoupled from the downlink beam for the downlink communications indicates an absence of a beam correspondence between the one or more uplink beams and the downlink beam.

Aspect 3: The method of any of aspects 1 through 2, wherein receiving the control signaling comprises: receiving a DCI message including a set of DCI fields, a first DCI field of the set of DCI fields indicating the one or more uplink beams for the uplink communications.

Aspect 4: The method of aspect 3, further comprising: determining an uplink component carrier associated with the one or more uplink beams based at least in part on a second DCI field of the set of DCI fields indicating the uplink component carrier, wherein transmitting the uplink communications is based at least in part on the uplink component carrier.

Aspect 5: The method of any of aspects 3 through 4, wherein receiving the DCI message is based at least in part on one or more of a RNTI, a format of the DCI message, a reserved value of one or more DCI fields of the DCI message, a search space set associated with the DCI message, or a CORESET associated with the DCI message.

Aspect 6: The method of any of aspects 3 through 5, further comprising: determining a grant scheduling one or more of the downlink communications or the uplink communications based at least in part on the DCI message, the downlink communications comprising a PDSCH transmission, the uplink communications comprising a PUSCH transmission, wherein transmitting the feedback message is based at least in part on one or more of the PDSCH transmission or the PUSCH transmission.

Aspect 7: The method of any of aspects 3 through 5, further comprising: determining an uplink resource to transmit the feedback message based at least in part on a subset of DCI fields of the set of DCI fields associated with the DCI message, wherein transmitting the feedback message is based at least in part on the uplink resource.

Aspect 8: The method of any of aspects 1 through 2, wherein receiving the control signaling comprises: receiving a MAC-CE including a set of MAC-CE fields, a first MAC-CE field of the set of MAC-CE fields indicating the one or more uplink beams for the uplink communications, wherein transmitting the feedback message is based at least in part on the MAC-CE.

Aspect 9: The method of aspect 8, further comprising: determining an uplink component carrier based at least in part on a second MAC-CE field of the set of MAC-CE fields indicating the uplink component carrier, wherein transmitting the uplink communications is based at least in part on the uplink component carrier.

Aspect 10: The method of any of aspects 8 through 9, wherein a subset of MAC-CE fields of the set of MAC-CE fields each indicate a respective uplink beam failure of a respective uplink beam associated with a respective uplink component carrier of the UE.

Aspect 11: The method of any of aspects 1 through 10, wherein the control signaling indicates an SRS resource ID corresponding to at least one SRS resource of a set of SRS resources, the at least one SRS resource corresponding to the one or more uplink beams.

Aspect 12: The method of any of aspects 1 through 11, further comprising: switching to the one or more uplink beams based at least in part on the control signaling indicating the one or more uplink beams for the uplink communications, wherein transmitting the uplink communications is based at least in part on switching to the one or more uplink beams, the uplink communications comprising one or more of a PUCCH transmission, a PUSCH transmission, an SRS transmission, or a PRACH transmission.

Aspect 13: The method of any of aspects 1 through 11, wherein receiving the control signaling comprises: receiving a DCI message scheduling the uplink communications; and switching to the one or more uplink beams for the uplink communications based at least in part on the DCI message satisfying a DCI format, the DCI message missing one or more DCI fields associated with one or more of an SRI field or a TCI field, wherein transmitting the uplink communications is based at least in part on switching to the one or more uplink beams, the uplink communications comprising one or more of a PUCCH transmission or a PUSCH transmission.

Aspect 14: The method of any of aspects 1 through 13, further comprising: switching to the one or more uplink beams for the uplink communications on one or more uplink component carriers, wherein the one or more uplink component carriers comprises one or more of an uplink component carrier indicated via the control signaling, or uplink component carriers in a same radio frequency spectrum band as the uplink component carrier.

Aspect 15: The method of any of aspects 1 through 14, further comprising: switching to the one or more uplink beams during a time period after receiving the control signaling indicating the one or more uplink beams for the uplink communications, wherein transmitting the uplink communications is based at least in part on switching to the one or more uplink beams during the time period after receiving the control signaling.

Aspect 16: The method of aspect 15, wherein the time period occurs after an ending symbol duration associated with receiving the control signaling.

Aspect 17: The method of aspect 15, wherein the time period occurs after an ending symbol duration associated with transmitting the feedback message.

Aspect 18: The method of any of aspects 15 through 17, wherein the time period occurs during a subsequent TTI.

Aspect 19: The method of any of aspects 1 through 18, further comprising: determining a set of SRS resources to use for uplink BFR based at least in part on a configuration; and transmitting a set of SRSs based at least in part on the set of SRS resources and a set of uplink beams, wherein receiving the control signaling indicating the one or more uplink beams for the uplink communications is based at least in part on the set of SRS resources, at least one SRS resource of the set of SRS resources corresponding to the one or more uplink beams.

Aspect 20: The method of aspect 19, further comprising: selecting the set of uplink beams based at least in part on one or more second uplink beams associated with an uplink control channel or one or more third uplink beams associated with uplink control resource IDs, wherein transmitting the set of SRSs is based at least in part on the selecting of the set of uplink beams.

Aspect 21: A method for wireless communication at a base station, comprising: transmitting control signaling based at least in part on an uplink beam failure, the control signaling indicating one or more uplink beams for uplink communications, the one or more uplink beams for the uplink communications being decoupled from a downlink beam for downlink communications; receiving a feedback message acknowledging the one or more uplink beams for the uplink communications based at least in part on the control signaling; and receiving the uplink communications using the one or more uplink beams based at least in part on the feedback message.

Aspect 22: The method of aspect 21, wherein the one or more uplink beams for the uplink communications being decoupled from the downlink beam for the downlink communications indicates an absence of a beam correspondence between the one or more uplink beams and the downlink beam.

Aspect 23: The method of any of aspects 21 through 22, wherein transmitting the control signaling comprises: transmitting a DCI message including a set of DCI fields, a first DCI field of the set of DCI fields indicating the one or more uplink beams for the uplink communications.

Aspect 24: The method of aspect 23, wherein a second DCI field of the set of DCI fields indicates an uplink component carrier associated with the one or more uplink beams.

Aspect 25: The method of any of aspects 23 through 24, wherein the DCI message corresponds to on one or more of an RNTI, a format of the DCI message, a reserved value of one or more DCI fields of the DCI message, a search space set associated with the DCI message, or a CORESET associated with the DCI message.

Aspect 26: The method of any of aspects 23 through 25, wherein the DCI message comprises a grant scheduling one or more of the downlink communications or the uplink communications, the downlink communications comprising a PDSCH transmission, the uplink communications comprising a PUSCH transmission, receiving the feedback message is based at least in part on one or more of the PDSCH transmission or the PUSCH transmission.

Aspect 27: The method of any of aspects 21 through 22, wherein transmitting the control signaling comprises: transmitting a MAC-CE including a set of MAC-CE fields, a first MAC-CE field of the set of MAC-CE fields indicating the one or more uplink beams for the uplink communications, wherein receiving the feedback message is based at least in part on the MAC-CE.

Aspect 28: The method of any of aspects 21 through 27, further comprising: transmitting a configuration indicating a set of SRS resources to use for uplink BFR; and receiving a set of SRSs based at least in part on the set of SRS resources and a set of uplink beams, wherein transmitting the control signaling indicating the one or more uplink beams for the uplink communications is based at least in part on the set of SRS resources, at least one SRS resource of the set of SRS resources corresponding to the one or more uplink beams.

Aspect 29: An apparatus for wireless communication at a UE, comprising a processor; memory coupled with the processor; and instructions stored in the memory and executable by the processor to cause the apparatus to perform a method of any of aspects 1 through 20.

Aspect 30: An apparatus for wireless communication at a UE, comprising at least one means for performing a method of any of aspects 1 through 20.

Aspect 31: A non-transitory computer-readable medium storing code for wireless communication at a UE, the code comprising instructions executable by a processor to perform a method of any of aspects 1 through 20.

Aspect 32: An apparatus for wireless communication at a base station, comprising a processor; memory coupled with the processor; and instructions stored in the memory and executable by the processor to cause the apparatus to perform a method of any of aspects 21 through 28.

Aspect 33: An apparatus for wireless communication at a base station, comprising at least one means for performing a method of any of aspects 21 through 28.

Aspect 34: A non-transitory computer-readable medium storing code for wireless communication at a base station, the code comprising instructions executable by a processor to perform a method of any of aspects 21 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   transmitting, using one or more first uplink beams, one or more uplink signals configured for uplink beam failure detection;
   receiving control signaling that indicates an uplink beam failure occurred based at least in part on measurements of the one or more uplink signals by a network node, the control signaling indicating one or more second uplink beams for uplink communications, the one or more second uplink beams for the uplink communications being decoupled from a downlink beam for downlink communications, wherein detection of the uplink beam failure by the network node is based at least in part on the one or more first uplink beams being decoupled from the downlink beam;
   transmitting a feedback message in response to the control signaling, wherein the feedback message acknowledges the one or more second uplink beams for the uplink communications that are indicated via the control signaling; and
   transmitting the uplink communications using the one or more second uplink beams that are indicated via the feedback message.

2. The method of claim 1, wherein the one or more second uplink beams for the uplink communications being decoupled from the downlink beam for the downlink communications indicates an absence of a beam correspondence between the one or more second uplink beams and the downlink beam.

3. The method of claim 1, wherein receiving the control signaling comprises:
   receiving a downlink control information message including a set of downlink control information fields, a first downlink control information field of the set of downlink control information fields indicating the one or more second uplink beams for the uplink communications.

4. The method of claim 3, further comprising:
   determining an uplink component carrier associated with the one or more second uplink beams based at least in part on a second downlink control information field of the set of downlink control information fields indicating the uplink component carrier,
   wherein transmitting the uplink communications is based at least in part on the uplink component carrier.

5. The method of claim 3, wherein receiving the downlink control information message is based at least in part on one or more of a radio network temporary identifier, a format of the downlink control information message, a reserved value of one or more downlink control information fields of the downlink control information message, a search space set associated with the downlink control information message, or a control resource set associated with the downlink control information message.

6. The method of claim 3, further comprising:
   determining a grant scheduling one or more of the downlink communications or the uplink communications based at least in part on the downlink control information message, the downlink communications comprising a physical downlink shared channel transmission, the uplink communications comprising a physical uplink shared channel transmission,
   wherein transmitting the feedback message is based at least in part on one or more of the physical downlink shared channel transmission or the physical uplink shared channel transmission.

7. The method of claim 3, further comprising:
   determining an uplink resource to transmit the feedback message based at least in part on a subset of downlink control information fields of the set of downlink control information fields associated with the downlink control information message,
   wherein transmitting the feedback message is based at least in part on the uplink resource.

8. The method of claim 1, wherein receiving the control signaling comprises:
   receiving a medium access control-control element including a set of medium access control-control element fields, a first medium access control-control element field of the set of medium access control-control element fields indicating the one or more second uplink beams for the uplink communications,
   wherein transmitting the feedback message is based at least in part on the medium access control-control element.

9. The method of claim 8, further comprising:
   determining an uplink component carrier based at least in part on a second medium access control-control element field of the set of medium access control-control element fields indicating the uplink component carrier,
   wherein transmitting the uplink communications is based at least in part on the uplink component carrier.

10. The method of claim 8, wherein a subset of medium access control-control element fields of the set of medium access control-control element fields each indicate a respective uplink beam failure of a respective uplink beam associated with a respective uplink component carrier of the UE.

11. The method of claim 1, wherein the control signaling indicates a sounding reference signal resource identifier corresponding to at least one sounding reference signal resource of a set of sounding reference signal resources, the at least one sounding reference signal resource corresponding to the one or more second uplink beams.

12. The method of claim 1, further comprising:
   switching to the one or more second uplink beams based at least in part on the control signaling indicating the one or more second uplink beams for the uplink communications,
   wherein transmitting the uplink communications is based at least in part on switching to the one or more second uplink beams, the uplink communications comprising one or more of a physical uplink control channel transmission, a physical uplink shared channel transmission, a sounding reference signal transmission, or a physical random access channel transmission.

13. The method of claim 1, wherein receiving the control signaling comprises:

receiving a downlink control information message scheduling the uplink communications; and
switching to the one or more second uplink beams for the uplink communications based at least in part on the downlink control information message satisfying a downlink control information format, the downlink control information message missing one or more downlink control information fields associated with one or more of a sounding reference signal resource indicator field or a transmission configuration indicator field,
wherein transmitting the uplink communications is based at least in part on switching to the one or more second uplink beams, the uplink communications comprising one or more of a physical uplink control channel transmission or a physical uplink shared channel transmission.

14. The method of claim 1, further comprising:
switching to the one or more second uplink beams for the uplink communications on one or more uplink component carriers,
wherein the one or more uplink component carriers comprises one or more of an uplink component carrier indicated via the control signaling, or uplink component carriers in a same radio frequency spectrum band as the uplink component carrier.

15. The method of claim 1, further comprising:
switching to the one or more second uplink beams during a time period after receiving the control signaling indicating the one or more second uplink beams for the uplink communications,
wherein transmitting the uplink communications is based at least in part on switching to the one or more second uplink beams during the time period after receiving the control signaling.

16. The method of claim 15, wherein the time period occurs after an ending symbol duration associated with receiving the control signaling.

17. The method of claim 15, wherein the time period occurs after an ending symbol duration associated with transmitting the feedback message.

18. The method of claim 15, wherein the time period occurs during a subsequent transmission time interval.

19. The method of claim 1, further comprising:
determining a set of sounding reference signal resources to use for uplink beam failure recovery based at least in part on a configuration; and
transmitting a set of sounding reference signals based at least in part on the set of sounding reference signal resources and a set of uplink beams,
wherein receiving the control signaling indicating the one or more second uplink beams for the uplink communications is based at least in part on the set of sounding reference signal resources, at least one sounding reference signal resource of the set of sounding reference signal resources corresponding to the one or more second uplink beams.

20. The method of claim 19, further comprising:
selecting the set of uplink beams based at least in part on one or more second uplink beams associated with an uplink control channel or one or more third uplink beams associated with uplink control resource identifiers, wherein transmitting the set of sounding reference signals is based at least in part on the selecting of the set of uplink beams.

21. A method for wireless communication at a network node, comprising:
receiving, using one or more first uplink beams, one or more uplink signals configured for uplink beam failure detection;
detecting an uplink beam failure based at least in part on measurements of the one or more uplink signals;
transmitting, in response to detecting the uplink beam failure, control signaling that indicates the uplink beam failure occurred, the control signaling indicating one or more second uplink beams for uplink communications, the one or more second uplink beams for the uplink communications being decoupled from a downlink beam for downlink communications, wherein detecting the uplink beam failure is based at least in part on the one or more first uplink beams being decoupled from the downlink beam;
receiving a feedback message in response to the control signaling, wherein the feedback message acknowledges the one or more second uplink beams for the uplink communications that are indicated via the control signaling; and
receiving the uplink communications using the one or more second uplink beams based at least in part on the feedback message.

22. The method of claim 21, wherein the one or more second uplink beams for the uplink communications being decoupled from the downlink beam for the downlink communications indicates an absence of a beam correspondence between the one or more second uplink beams and the downlink beam.

23. The method of claim 21, wherein transmitting the control signaling comprises:
transmitting a downlink control information message including a set of downlink control information fields, a first downlink control information field of the set of downlink control information fields indicating the one or more second uplink beams for the uplink communications.

24. The method of claim 23, wherein a second downlink control information field of the set of downlink control information fields indicates an uplink component carrier associated with the one or more second uplink beams.

25. The method of claim 23, wherein the downlink control information message corresponds to on one or more of a radio network temporary identifier, a format of the downlink control information message, a reserved value of one or more downlink control information fields of the downlink control information message, a search space set associated with the downlink control information message, or a control resource set associated with the downlink control information message.

26. The method of claim 23, wherein the downlink control information message comprises a grant scheduling one or more of the downlink communications or the uplink communications, the downlink communications comprising a physical downlink shared channel transmission, the uplink communications comprising a physical uplink shared channel transmission, wherein receiving the feedback message is based at least in part on one or more of the physical downlink shared channel transmission or the physical uplink shared channel transmission.

27. The method of claim 21, wherein transmitting the control signaling comprises:
transmitting a medium access control-control element including a set of medium access control-control element fields, a first medium access control-control element field of the set of medium access control-control element fields indicating the one or more second uplink beams for the uplink communications, wherein receiving the feedback message is based at least in part on the medium access control-control element.

28. The method of claim 21, further comprising:

transmitting a configuration indicating a set of sounding reference signal resources to use for uplink beam failure recovery; and receiving a set of sounding reference signals based at least in part on the set of sounding reference signal resources and a set of uplink beams, wherein transmitting the control signaling indicating the one or more second uplink beams for the uplink communications is based at least in part on the set of sounding reference signal resources, at least one sounding reference signal resource of the set of sounding reference signal resources corresponding to the one or more second uplink beams.

29. An apparatus for wireless communication at a user equipment (UE), comprising:

a processor;

memory coupled with the processor; and instructions stored in the memory and executable by the processor to cause the apparatus to:

transmit, using one or more first uplink beams, one or more uplink signals configured for uplink beam failure detection;

receive control signaling that indicates an uplink beam failure occurred based at least in part on measurements of the one or more uplink signals by a network node, the control signaling indicating one or more second uplink beams for uplink communications, the one or more second uplink beams for the uplink communications being decoupled from a downlink beam for downlink communications, wherein detection of the uplink beam failure by the network node is based at least in part on the one or more first uplink beams being decoupled from the downlink beam;

transmit a feedback message in response to the control signaling, wherein the feedback message acknowledges the one or more second uplink beams for the uplink communications that are indicated via the control signaling; and transmit the uplink communications using the one or more second uplink beams based at least in part on the feedback message.

30. An apparatus for wireless communication at a network node, comprising:

a processor;

memory coupled with the processor; and instructions stored in the memory and executable by the processor to cause the apparatus to:

receive, using one or more first uplink beams, one or more uplink signals configured for uplink beam failure detection;

detect an uplink beam failure based at least in part on measurements of the one or more uplink signals;

transmit, in response to detecting the uplink beam failure, control signaling that indicates the uplink beam failure occurred, the control signaling indicating one or more second uplink beams for uplink communications, the one or more second uplink beams for the uplink communications being decoupled from a downlink beam for downlink communications, wherein detecting the uplink beam failure is based at least in part on the one or more first uplink beams being decoupled from the downlink beam;

receive a feedback message in response to the control signaling, wherein the feedback message acknowledges the one or more second uplink beams for the uplink communications that are indicated via the control signaling; and receive the uplink communications using the one or more second uplink beams based at least in part on the feedback message.

* * * * *